(12) United States Patent
Sweet et al.

(10) Patent No.: US 8,005,843 B2
(45) Date of Patent: Aug. 23, 2011

(54) RETRIEVING DOCUMENTS TRANSITIVELY LINKED TO AN INITIAL DOCUMENT

(75) Inventors: Richard Eric Sweet, Mountain View, CA (US); Edward Royce Warren Rowe, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 499 days.

(21) Appl. No.: 12/124,109

(22) Filed: May 20, 2008

(65) Prior Publication Data

US 2008/0222091 A1 Sep. 11, 2008

Related U.S. Application Data

(60) Continuation of application No. 10/933,902, filed on Sep. 3, 2004, now Pat. No. 7,401,067, which is a continuation of application No. 10/388,093, filed on Mar. 13, 2003, now Pat. No. 6,789,080, which is a continuation of application No. 10/071,762, filed on Feb. 6, 2002, now Pat. No. 6,567,799, which is a division of application No. 08/970,743, filed on Nov. 14, 1997, now Pat. No. 6,415,278.

(51) Int. Cl.
*G06F 17/30* (2006.01)

(52) U.S. Cl. .......................... 707/741; 715/236

(58) Field of Classification Search .......... 707/741–747; 715/202, 205, 209, 236; 709/218, 250
See application file for complete search history.

(56) References Cited

U.S. PATENT DOCUMENTS

| | | | |
|---|---|---|---|
| 4,945,475 A | 7/1990 | Bruffey et al. | 707/999.001 |
| 5,043,891 A | 8/1991 | Goldstein et al. | 715/234 |
| 5,228,121 A | 7/1993 | Fontaine et al. | 715/234 |
| 5,301,286 A | 4/1994 | Rajani | 711/202 |
| 5,367,573 A * | 11/1994 | Quimby | 713/167 |
| 5,446,653 A | 8/1995 | Miller et al. | 705/4 |
| 5,530,852 A | 6/1996 | Meske, Jr. et al. | 709/206 |
| 5,553,284 A | 9/1996 | Barbara et al. | 707/700 |
| 5,572,643 A | 11/1996 | Judson | 709/218 |
| 5,634,064 A | 5/1997 | Warnock et al. | 715/208 |
| 5,659,729 A | 8/1997 | Nielsen | 707/999.003 |
| 5,694,546 A | 12/1997 | Reisman | 705/27.1 |
| 5,708,826 A | 1/1998 | Ikeda et al. | 715/209 |
| 5,745,908 A | 4/1998 | Anderson et al. | 715/234 |
| 5,764,908 A | 6/1998 | Shoji et al. | 709/217 |
| 5,781,629 A * | 7/1998 | Haber et al. | 713/177 |

(Continued)

FOREIGN PATENT DOCUMENTS

EP 0 281 225 9/1988

(Continued)

OTHER PUBLICATIONS

D. De Roure, et al. "A Distributed Hypermedia Link Service" IEEE 1996 pp. 156-161.

(Continued)

*Primary Examiner* — Wilson Lee
(74) *Attorney, Agent, or Firm* — Fish & Richardson P.C.

(57) ABSTRACT

A method for creating a distinguishing identifier of a collection of data including a primary document and one or more auxiliary documents digests each auxiliary document to create a respective auxiliary document digest, and creates a distinguishing identifier by digesting a concatenation of the primary document with all auxiliary document digests.

12 Claims, 25 Drawing Sheets

U.S. PATENT DOCUMENTS

| | | | |
|---|---|---|---|
| 5,809,250 A | 9/1998 | Kisor | 709/227 |
| 5,864,852 A | 1/1999 | Luotonen | 726/14 |
| 5,873,077 A | 2/1999 | Kanoh et al. | 370/352 |
| 5,887,171 A | 3/1999 | Tada et al. | 719/317 |
| 5,892,908 A | 4/1999 | Hughes et al. | 709/250 |
| 5,893,914 A | 4/1999 | Clapp | 715/205 |
| 5,930,813 A | 7/1999 | Padgett et al. | 715/207 |
| 5,937,406 A | 8/1999 | Balabine et al. | 707/999.1 |
| 5,940,843 A | 8/1999 | Zucknovich et al. | 715/210 |
| 5,953,732 A | 9/1999 | Meske et al. | 715/239 |
| 5,963,966 A | 10/1999 | Mitchell et al. | 715/236 |
| 5,987,480 A | 11/1999 | Donohue et al. | 715/207 |
| 5,987,482 A | 11/1999 | Bates et al. | 715/206 |
| 5,991,878 A * | 11/1999 | McDonough et al. | 726/9 |
| 6,005,945 A * | 12/1999 | Whitehouse | 380/51 |
| 6,026,433 A | 2/2000 | D'Arlach et al. | 709/217 |
| 6,029,182 A | 2/2000 | Nehab et al. | 715/205 |
| 6,035,323 A | 3/2000 | Narayen et al. | 709/201 |
| 6,038,573 A | 3/2000 | Parks | 715/202 |
| 6,061,698 A | 5/2000 | Chadha et al. | 715/207 |
| 6,061,700 A | 5/2000 | Brobst et al. | 715/206 |
| 6,072,461 A | 6/2000 | Haran | 345/629 |
| 6,081,907 A * | 6/2000 | Witty et al. | 714/6 |
| 6,096,096 A | 8/2000 | Murphy et al. | 717/175 |
| 6,115,723 A | 9/2000 | Fallside | 715/210 |
| 6,125,388 A | 9/2000 | Reisman | 709/218 |
| 6,157,649 A * | 12/2000 | Peirce et al. | 370/401 |
| 6,157,917 A * | 12/2000 | Barber | 705/26 |
| 6,167,409 A | 12/2000 | DeRose et al. | 715/234 |
| 6,192,382 B1 | 2/2001 | Lafer et al. | 715/205 |
| 6,208,995 B1 | 3/2001 | Himmel et al. | 706/6 |
| 6,209,004 B1 | 3/2001 | Taylor | 715/236 |
| 6,230,173 B1 | 5/2001 | Ferrel et al. | 715/205 |
| 6,237,011 B1 | 5/2001 | Ferguson et al. | 715/234 |
| 6,237,060 B1 | 5/2001 | Shilts et al. | 715/110 |
| 6,243,740 B1 | 6/2001 | Minneman et al. | 709/206 |
| 6,263,352 B1 | 7/2001 | Cohen | 715/206 |
| 6,308,188 B1 | 10/2001 | Bernardo et al. | 715/234 |
| 6,313,835 B1 | 11/2001 | Gever et al. | 715/846 |
| 6,351,755 B1 | 2/2002 | Najork et al. | 715/206 |
| 6,377,993 B1 | 4/2002 | Brandt et al. | 709/227 |
| 6,415,278 B1 | 7/2002 | Sweet et al. | 707/770 |
| 6,449,636 B1 | 9/2002 | Kredo et al. | 709/206 |
| 6,460,060 B1 | 10/2002 | Maddalozzo et al. | 715/234 |
| 6,493,758 B1 | 12/2002 | McLain | 709/227 |
| 6,538,673 B1 | 3/2003 | Maslov | 715/853 |
| 6,567,799 B2 | 5/2003 | Sweet et al. | 707/999.002 |
| 6,594,682 B2 | 7/2003 | Peterson et al. | 718/102 |
| 6,605,120 B1 | 8/2003 | Field et al. | 715/239 |
| 6,681,255 B1 | 1/2004 | Cooper et al. | 709/232 |
| 6,769,009 B1 | 7/2004 | Reisman | 709/201 |
| 6,789,080 B1 | 9/2004 | Sweet et al. | 707/999.002 |
| 6,810,404 B1 | 10/2004 | Ferguson et al. | 707/999.005 |
| 6,864,904 B1 | 3/2005 | Ran et al. | 715/760 |
| 6,907,463 B1 | 6/2005 | Kleinpeter, III et al. | 709/228 |
| 6,925,594 B2 | 8/2005 | Dutta et al. | 715/205 |
| 6,990,633 B1 | 1/2006 | Miyasaka et al. | 715/201 |
| 7,039,658 B2 | 5/2006 | Starkey | 707/999.201 |
| 7,085,997 B1 | 8/2006 | Wu et al. | 715/201 |
| 2001/0034658 A1 | 10/2001 | Silva et al. | 705/26 |
| 2001/0047326 A1 | 11/2001 | Broadbent et al. | 705/38 |
| 2001/0047375 A1 | 11/2001 | Fest | 715/208 |
| 2001/0054020 A1 | 12/2001 | Barth et al. | 705/37 |
| 2002/0026462 A1 | 2/2002 | Shotton et al. | 715/239 |
| 2002/0032701 A1 | 3/2002 | Gao et al. | 715/240 |
| 2002/0065851 A1 | 5/2002 | Watson et al. | 715/205 |
| 2002/0103828 A1 | 8/2002 | Kupiec et al. | 715/234 |
| 2002/0152245 A1 | 10/2002 | McCaskey et al. | 715/234 |
| 2002/0178190 A1 | 11/2002 | Pope et al. | 715/234 |
| 2002/0188633 A1 | 12/2002 | Davis et al. | 715/234 |
| 2002/0198962 A1 | 12/2002 | Horn et al. | 709/218 |
| 2003/0061569 A1 | 3/2003 | Aoki | 715/234 |
| 2003/0135824 A1 | 7/2003 | Ullmann et al. | 715/202 |
| 2003/0172343 A1 | 9/2003 | Leymaster et al. | 715/234 |
| 2003/0212891 A1 | 11/2003 | Evans et al. | 713/168 |
| 2004/0012625 A1 | 1/2004 | Lei et al. | 715/738 |
| 2004/0030741 A1 | 2/2004 | Wolton et al. | 709/202 |
| 2004/0205654 A1 | 10/2004 | Eisen | 715/200 |
| 2005/0028090 A1 | 2/2005 | Sweet | 715/205 |
| 2005/0091340 A1 | 4/2005 | Facemire et al. | 709/218 |

FOREIGN PATENT DOCUMENTS

| | | |
|---|---|---|
| EP | 0 620 517 A1 | 10/1994 |
| JP | 06-266702 | 9/1994 |
| JP | 6301732 | 10/1994 |
| JP | 6309128 | 11/1994 |
| JP | 07-121344 | 5/1995 |
| JP | 07-160683 | 6/1995 |
| WO | WO96/00945 | 1/1996 |
| WO | WO 99/35592 | 7/1999 |

OTHER PUBLICATIONS

C. Mic Bowman, et al. "The Harvest Information Discovery and Access System" 1995, 9 pages.

EPO, Non-Final Office Action, in Application No. 07 009 645.8, mailed Jul. 20, 2009, 6 pages.

"ForeFront's to be Bundled with CE Software's WeArranger; Users of WebArranger Now Able to Capture Whole Web Sites and View Offline", downloaded from the internet on Oct. 6, 2009 at http://www.thefreelibrary.com/_/print/PrintArticle.aspx?id+17872995, 3 pages.

WebWhacker 2.0 User Guide, 1996, downloaded from the internet, http://www.thefreelibrary.com/_/print/PrintArticle.aspx?id=18382834, 107 pages.

Shelton, Denise, "ForeFront releases WebWhacker 1.0", downloaded from the internet on Oct. 2, 2009 at http://news.cnet.com/ForeFront-releases-WebWhacker-1.0/2100-1001_3-201337.html., 1 page.

Strom, David, "Offline Web browsing: It's like surfing in Ohio", downloaded in the internet on Oct. 2, 2009 at http://www.strom.com/pubwork/iwoffline.html., 3 pages.

Hurlbert, Lawrence, "WebWhacker for Window 95/NT Software Review", downloaded from the internet on Oct. 2, 2009 at http://www.alamopc.org/pcalamode/reviews/archive1/rev218html, 3 pages.

WebWhacker Product Documentation—Readme, Tips and Quick files from WebWhacker v1.0b11e installation directory (copyright 1995) 21 pages.

JPO Non-Final Office Action in Japan App. No. 2008-321351, mailed Jun. 9, 2009.

Adobe Systems, Inc., Portable Document Format Reference Manual, Addison Wesley Publishing Co., 1993.

Aho & Ullman, Principles of Compiler Design, Addison Wesley, 1977.

Bertino, et al. "An Evaluation of Text Access Methods", Instituto di Elaborazione dell'Informazione, 1989, IEEE, pp. 810-819.

Database Internet, Online, www.easysw.com; Mar. 10, 1998.

DigiDox and Adobe Acrobat, "A powerful combination," DigiDox, Inc. (1996).

Graham, HTML Sourcebook, Third Edition, Wiley Computer Publishing, 1997.

Hrvoje Niksic, Jun. 24, 1996, "Geturl: Software for non-interactive downloading," webpage: http://groups.google.com/group/comp.infosystems.www.announce/msg/4268334d269d42ce.

Imamura, Japanese Patent Office, Examination Corp. 4, Office Action for JP 10-325495 dated Aug. 21, 2007, 6 pages.

Kuwa, "Home Page Super Technique: Magnificent Arrangement for your Home Page by Java, Movie, etc." Mac Fan Internet, K.K. Mainichi Communications, Aug. 1, 1997, vol. 2, No. 8, pp. 130-133.

Skinner R., "Cross-Platform Formatting Programs" Library Software Review, Summer 1994, USA, vol. 13, No. 2, pp. 152-156.

Yamashina, "Introduction of a Manual Production System using SGML", Research Report of the Society of Information Processing, Corporation of Society of Information Processing, Sep. 19, 1997, vol. 97, No. 93, p. 25-30.

Yoo, et al. "Performance Evaluation of Dynamic Signature File Methods", COMPSAC '95, IEEE, Aug. 1995 p. 144-149.

Office Action for Application No. 98 308 818.8 dated Dec. 14, 2006, 2 pages.

Office Action for Application No. 2008-321351, mailed Apr. 6, 2010, 2 pages.

Office Action for Application No. 10-325495, mailed Feb. 12, 2008 2 pages.
Office Action for Application No. 10-325495, mailed Aug. 19, 2008, 3 pages.

Office Action for Application No. 98 308 818.8, mailed Mar. 24, 2005, 5 pages.

* cited by examiner

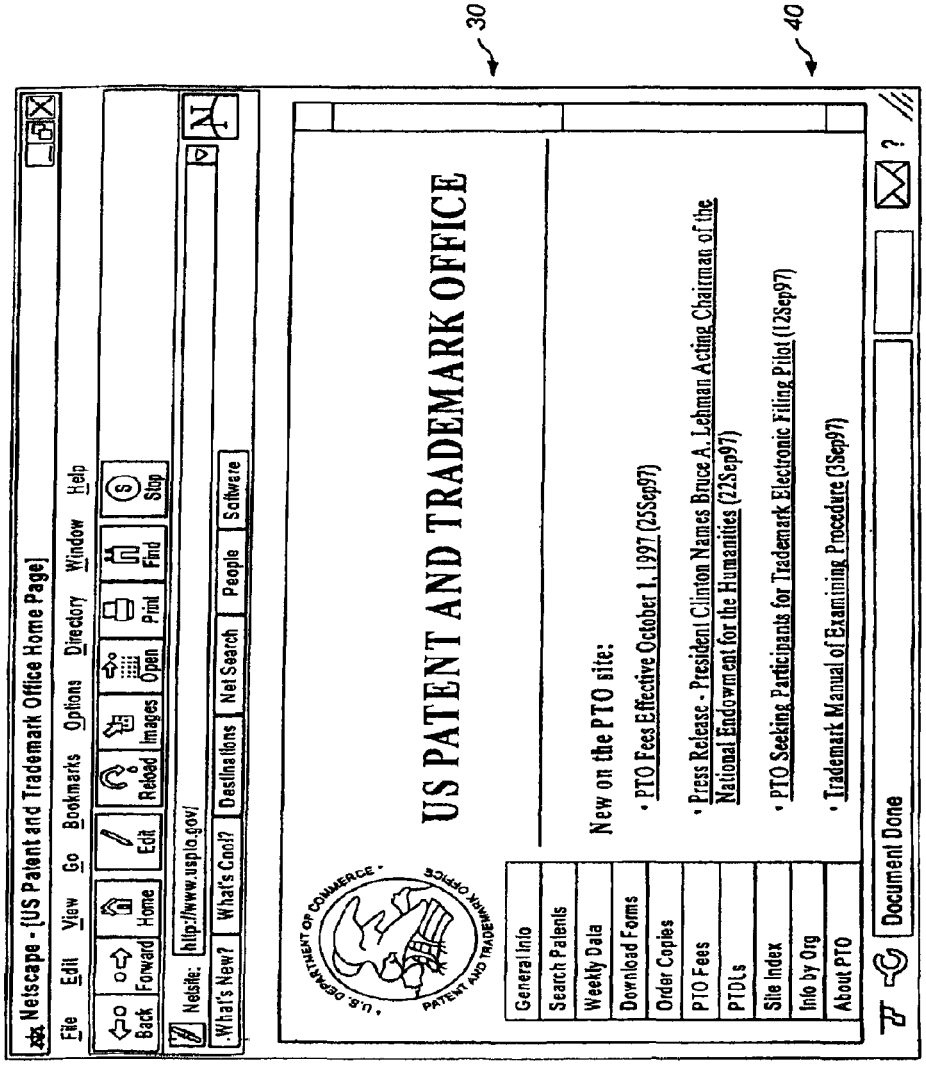
FIG._1
(PRIOR ART)

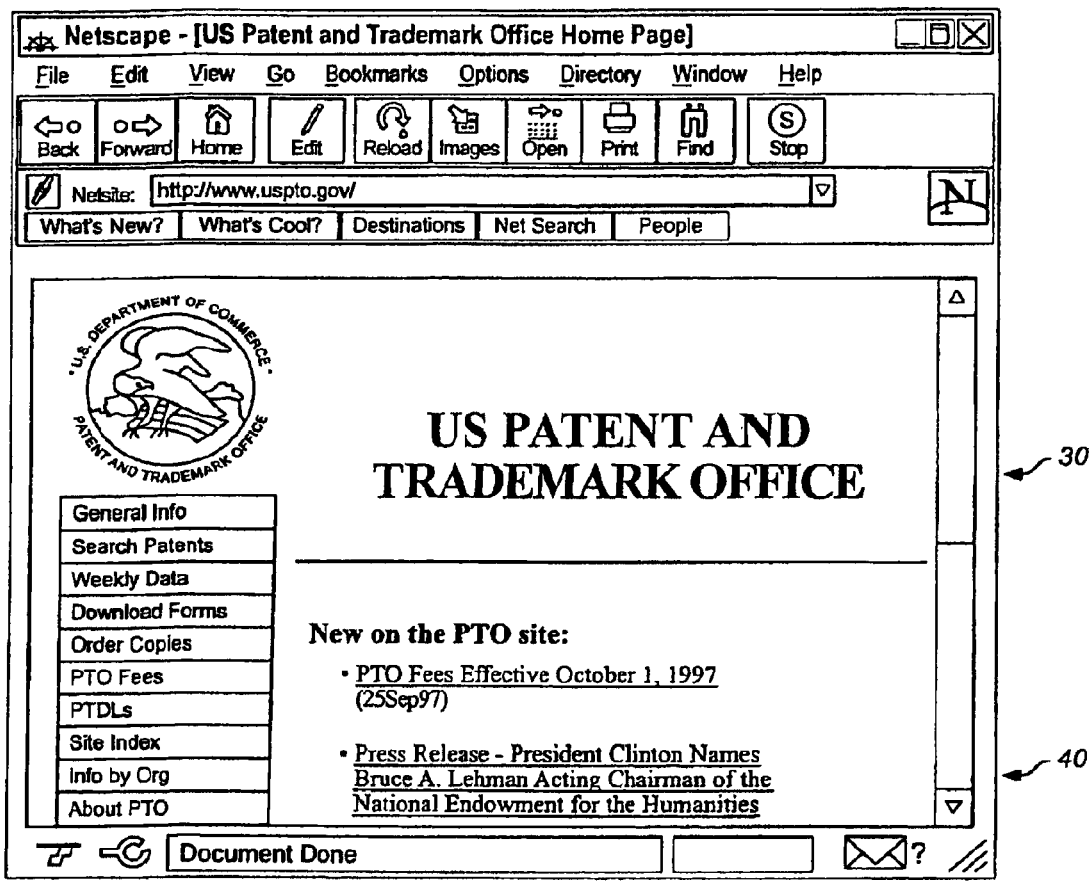
FIG._2
*(PRIOR ART)*

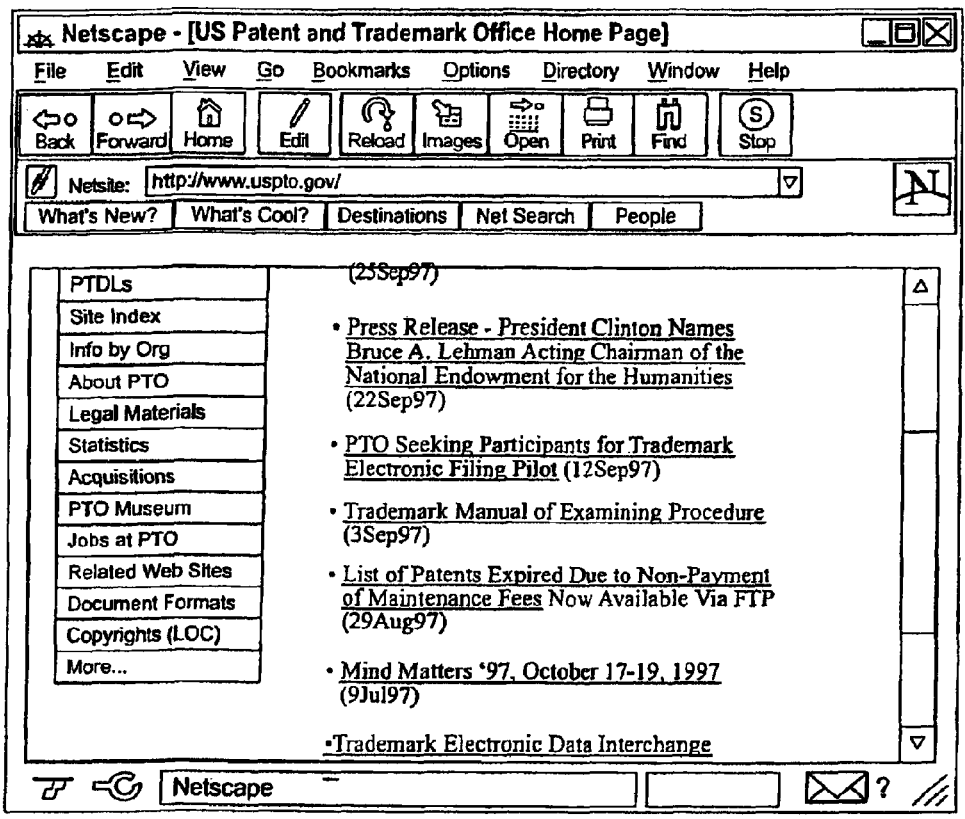
FIG._3
(PRIOR ART)

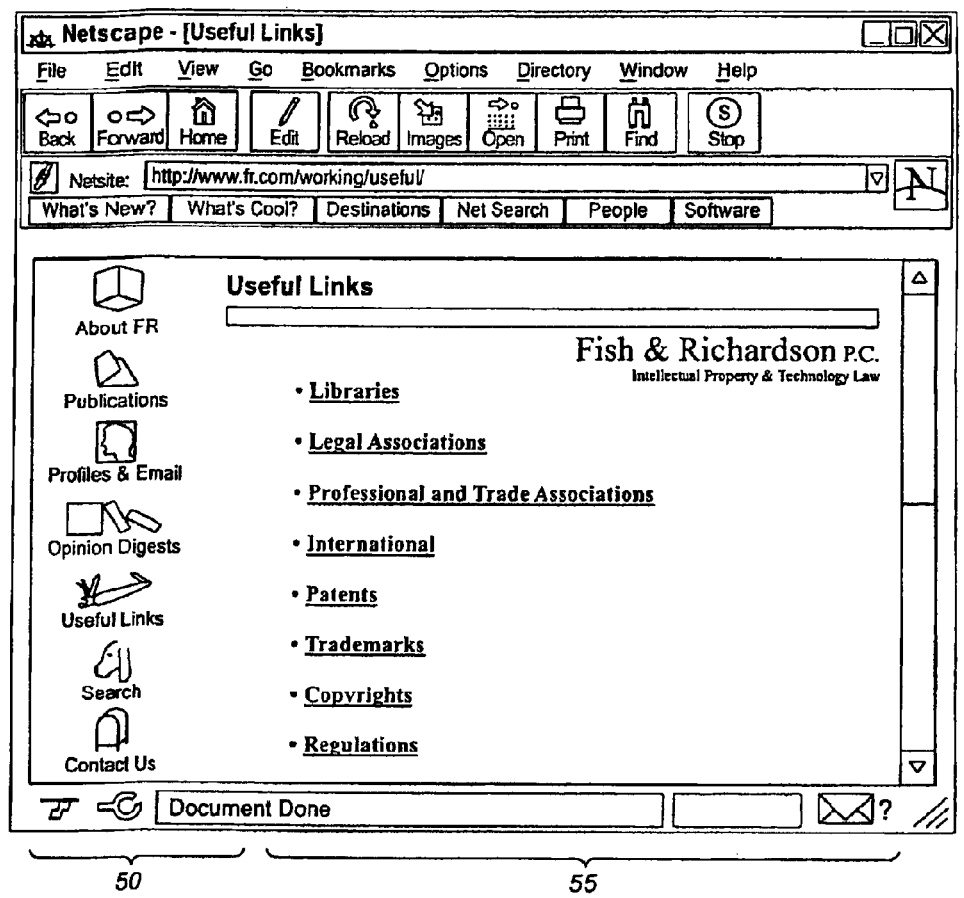
FIG._4
*(PRIOR ART)*

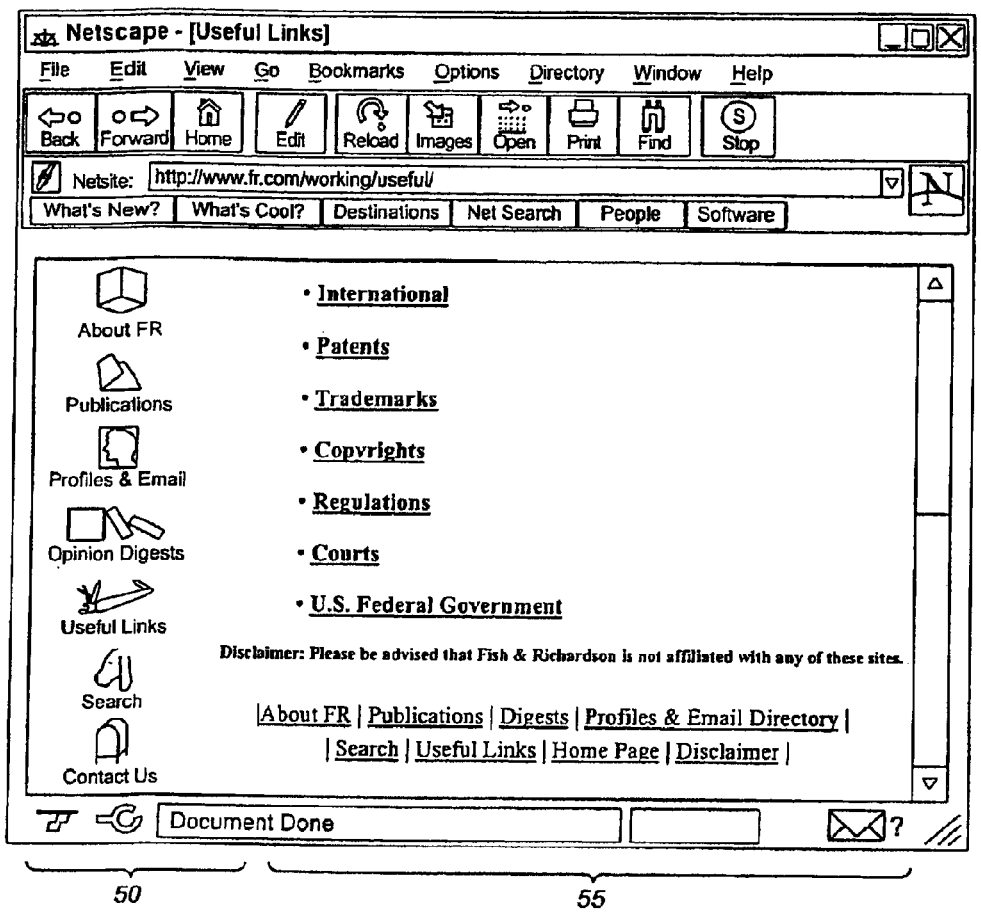
FIG._5
*(PRIOR ART)*

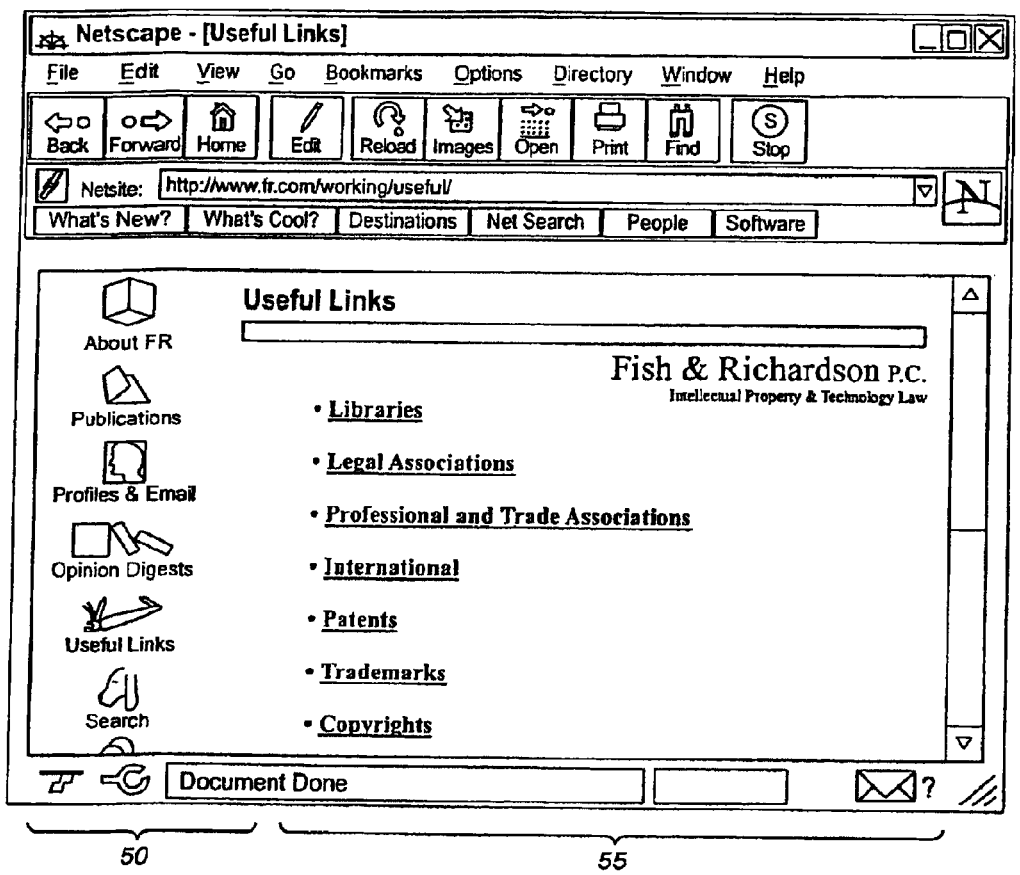
FIG._6
*(PRIOR ART)*

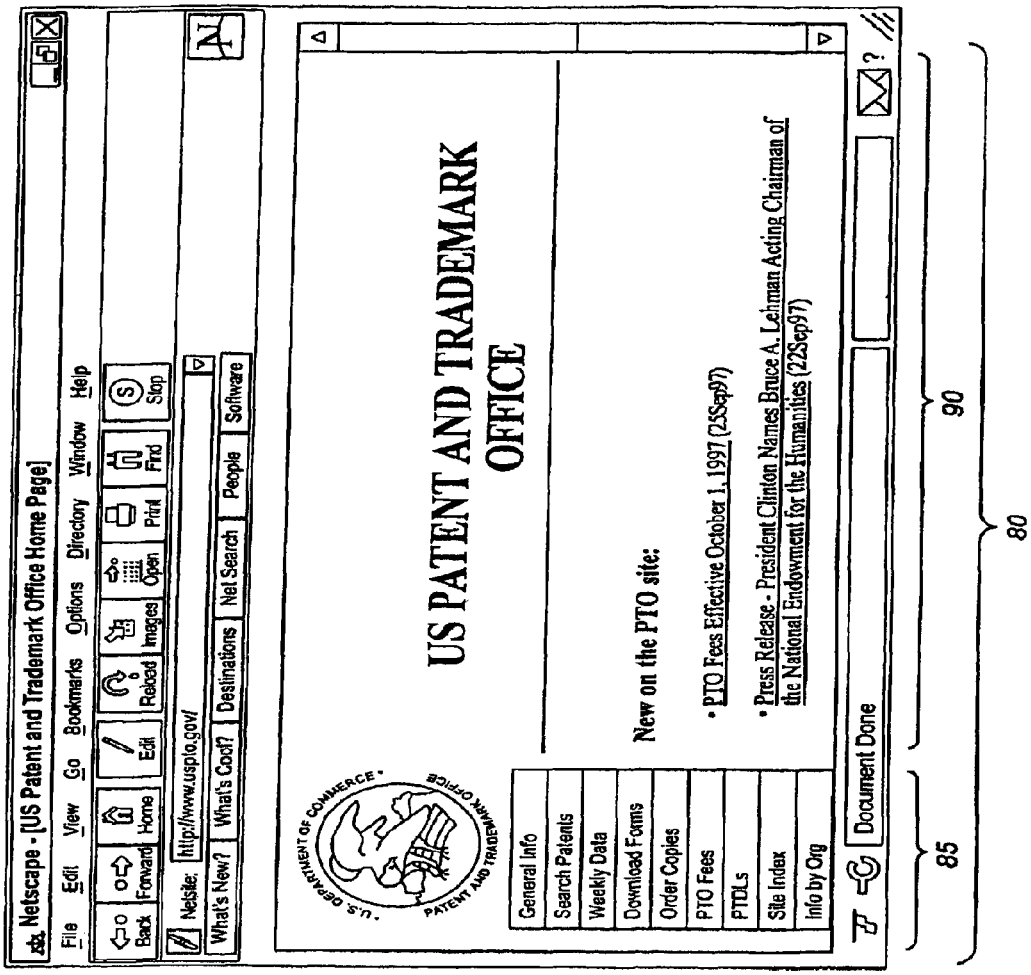
FIG._7
(PRIOR ART)

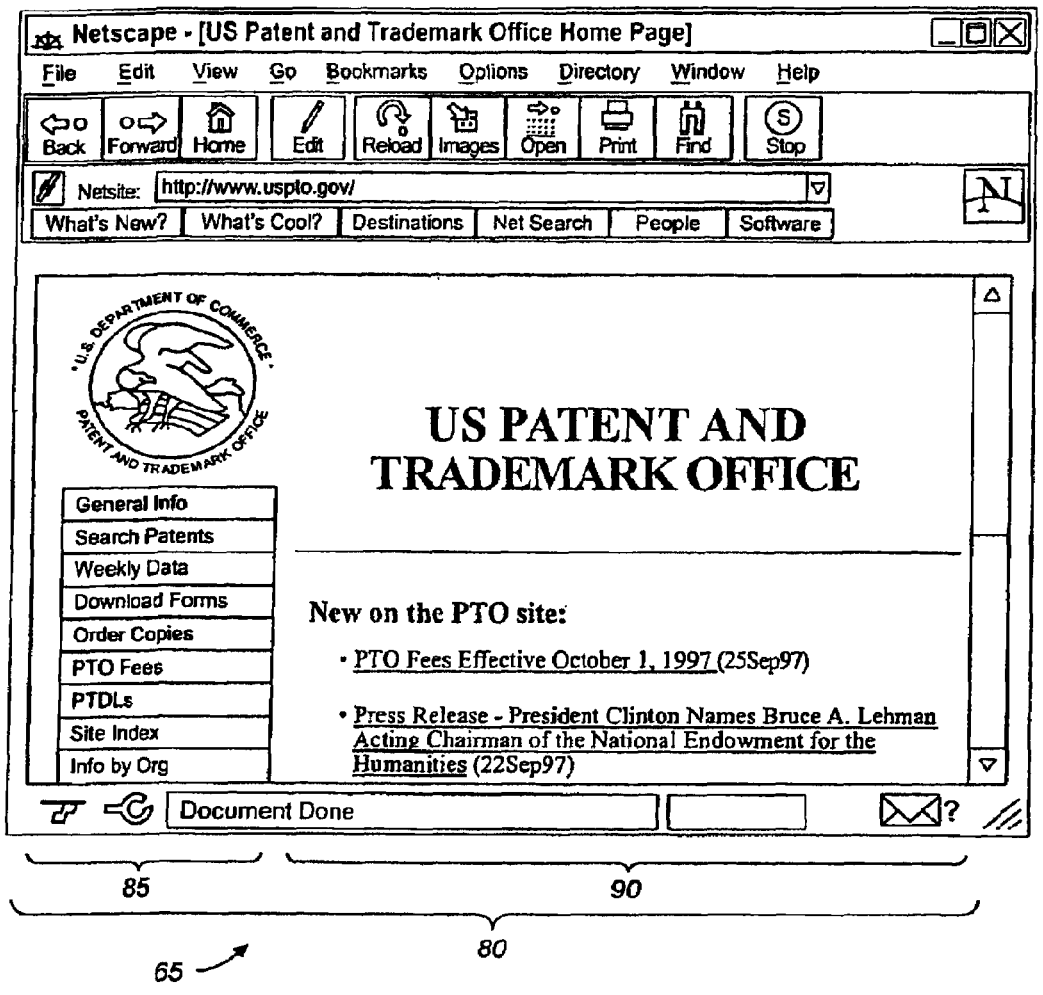
FIG._8
(PRIOR ART)

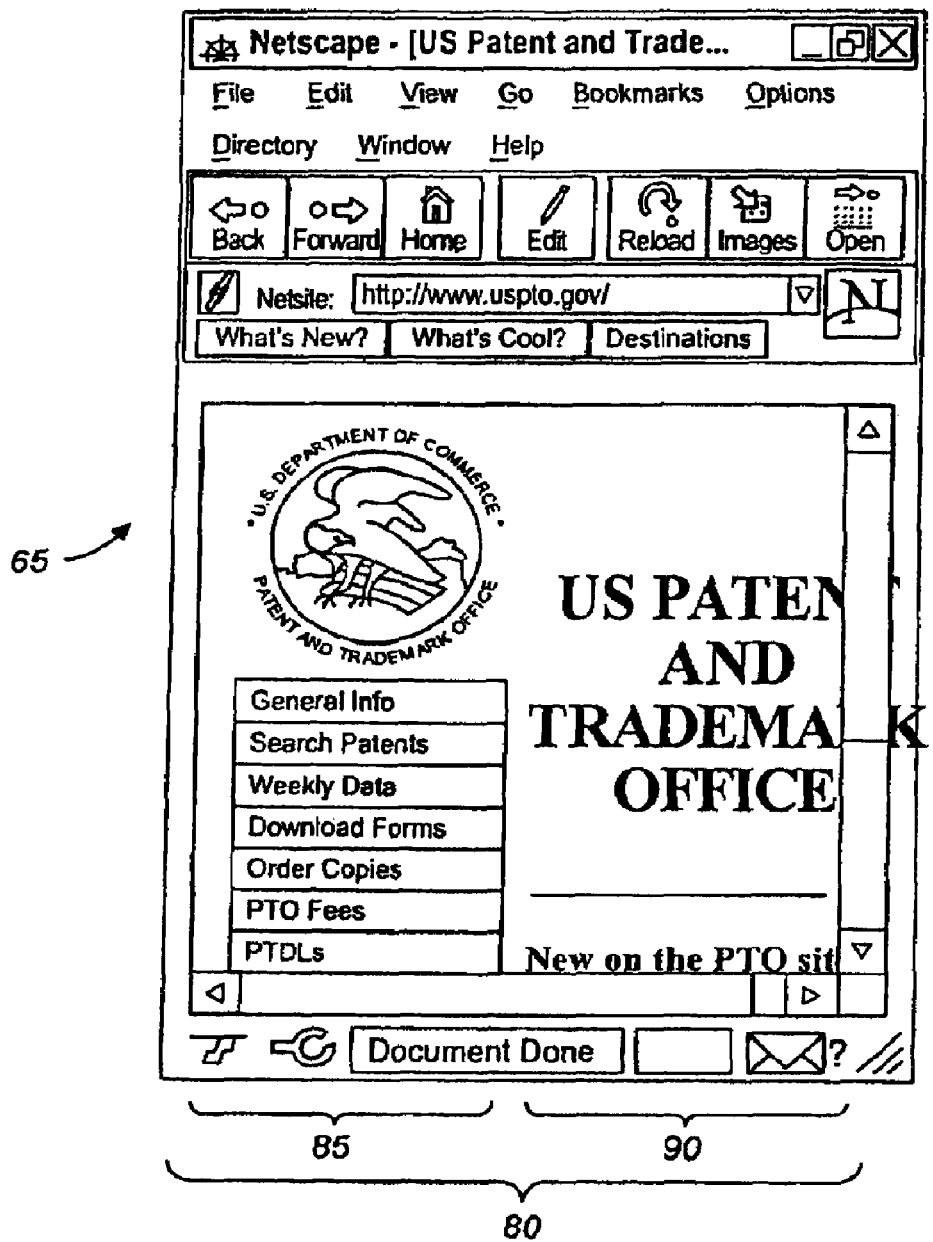
FIG._9
*(PRIOR ART)*

```
<html>
<head>
<title> US Patent Trademark Office Home Page</title>
</head>

<body bgcolor=white background="/web/gifs/tanns.gif">

<table>
<tr>
<td width=130 valign=top><IMG SRC="map1.gif" border=no ISMAP USEMAP="#hpl">
<MAP NAME="hpl">
<AREA SHAPE="RECT" COORDS="3,122,117,143" HREF="/web/menu/menu4.html">
<AREA SHAPE="RECT" COORDS="2,148,117,168" HREF="http://patents.uspto.gov">
<AREA SHAPE="RECT" COORDS="3,174,115,195" HREF="/web/menu/patdata.html">
<AREA SHAPE="RECT" COORDS="3,200,116,222" HREF="/web/forms/index.html">
<AREA SHAPE="RECT" COORDS="4,226,116,247"
HREF="/web/offices/ac/ido/opr/ptcs/index.html">
<AREA SHAPE="RECT" COORDS="4,252,117,272" HREF="/web/offices/ac/qs/ope/fees.html">
<AREA SHAPE="RECT" COORDS="3,278,116,297" HREF="/web/offices/ac/ido/cpti/ptdlhm3.htm">
<AREA SHAPE="RECT" COORDS="2,304,116,323" HREF="/web/navaids/siteindex.html">
<AREA SHAPE="RECT" COORDS="3,330,116,348" HREF="/web/menu/offices.html">
<AREA SHAPE="RECT" COORDS="3,355,116,375" HREF="/web/menu/menu1.html">
<AREA SHAPE="RECT" COORDS="2,381,116,401" HREF="/web/menu/menu5.html">
<AREA SHAPE="RECT" COORDS="2,407,116,428"
HREF="/web/offices/ac/ido/oeip/taf/index.html">
<AREA SHAPE="RECT" COORDS="3,433,115,453"
HREF="/web/offices/ac/comp/proc/acquisitions/index.html">
<AREA SHAPE="RECT" COORDS="2,459,116,480"
HREF="/web/offices/ac/ahrpa/opa/museum/index.html">
<AREA SHAPE="RECT" COORDS="2,485,117,507"
HREF="/web/offices/ac/ahrpa/ohr/employment/index.html">
<AREA SHAPE="RECT" COORDS="4,511,116,532" HREF="/web/menu/other.html">
<AREA SHAPE="RECT" COORDS="2,537,116,556" HREF="/web/menu/viewers.html">
<AREA SHAPE="RECT" COORDS="2,561,116,581" HREF="http://lcweb.loc.gov/copyright/">
<AREA SHAPE="RECT" COORDS="3,586,117,607" HREF="/web/menu/more.html">
</MAP>
</td>
<td valign=top><center><H1><br><br><br><font color=red>
US PATENT AND TRADEMARK OFFICE</font></H1></center>
<p><br></p>
<font color=navy>
<HR>
<H2>New on the PTO site:</H2>
<b>
<UL>

<LI><A HREF="/web/offices/ac/qs/ope/fee98.html">
PTO Fees Effective October 1, 1997</A> (25Sep97)<P></LI>

<LI><A HREF="/web/offices/com/speeches/index.html">
Press Release - President Clinton Names Bruce A. Lehman
Acting Chairman of the National Endowment for the Humanities
</A> (22Sep97)<P></LI>

<LI><A HREF="/web/offices/tac/teasann.htm">PTO Seeking Participants
for Trademark Electronic Filing Pilot</A> (12Sep97)<P></LI>

<LI><A HREF="/web/offices/tac/temp">
Trademark Manual of Examining Procedure</A> (3Sep97)<P></LI>

.
        .
        .
</UL>
</b>
</font>
</td>
</tr>
</table>
        .
        .
        .
</body>
</html>
```

FIG._10
*(PRIOR ART)*

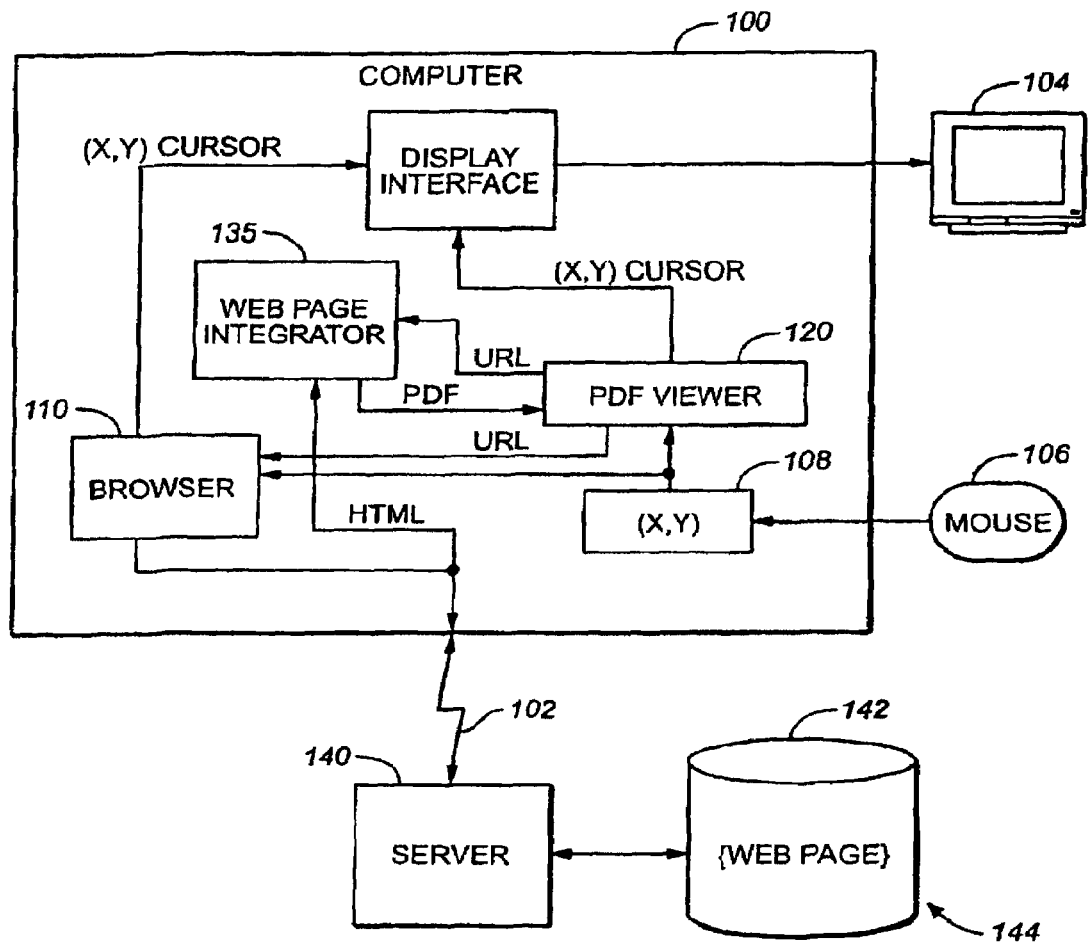
FIG._11

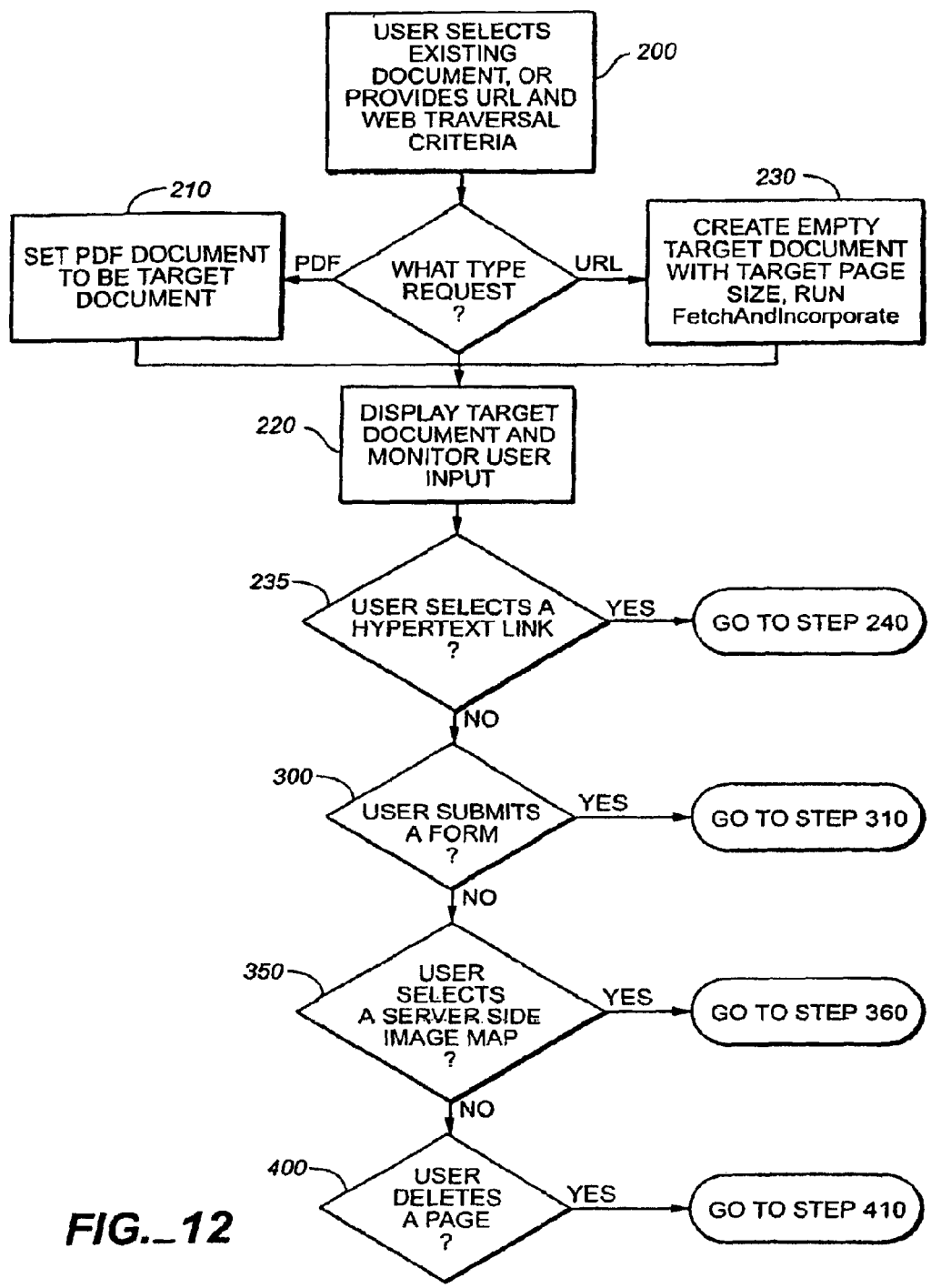
FIG._12

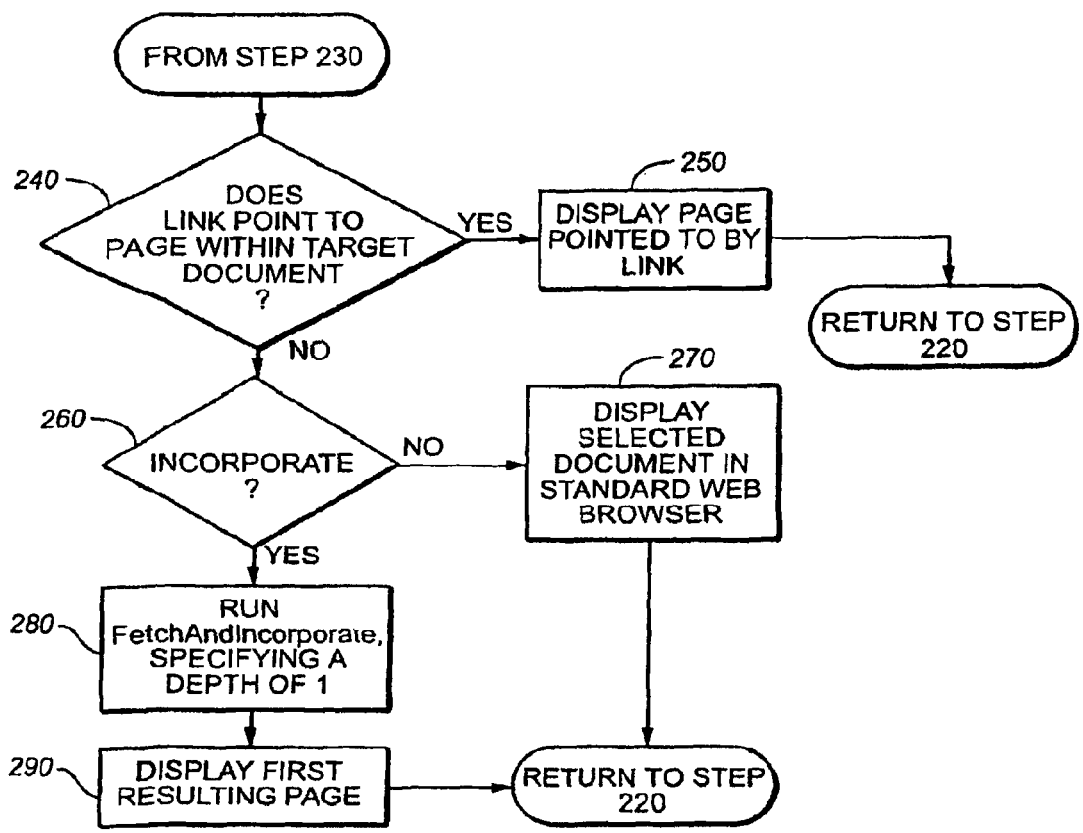
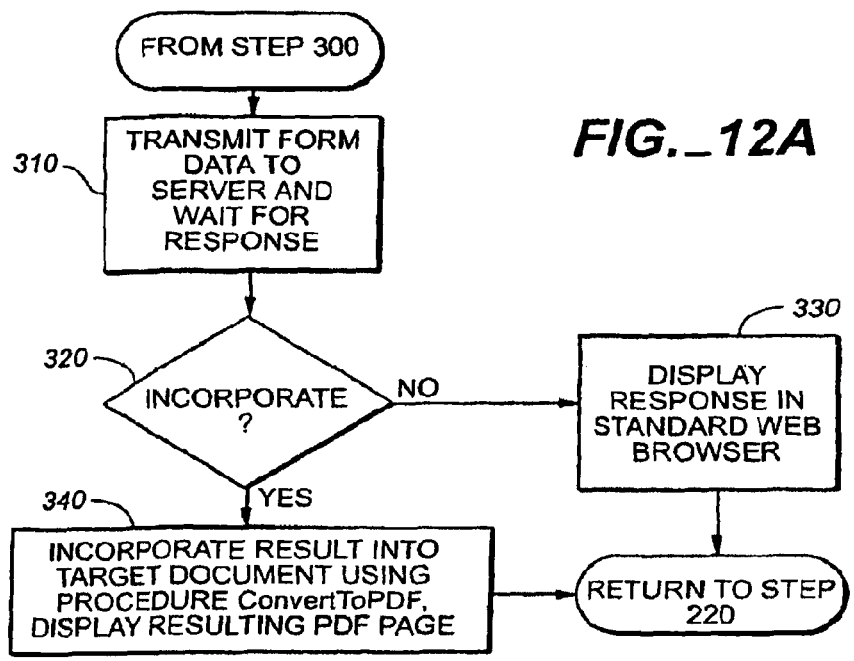
FIG._12A

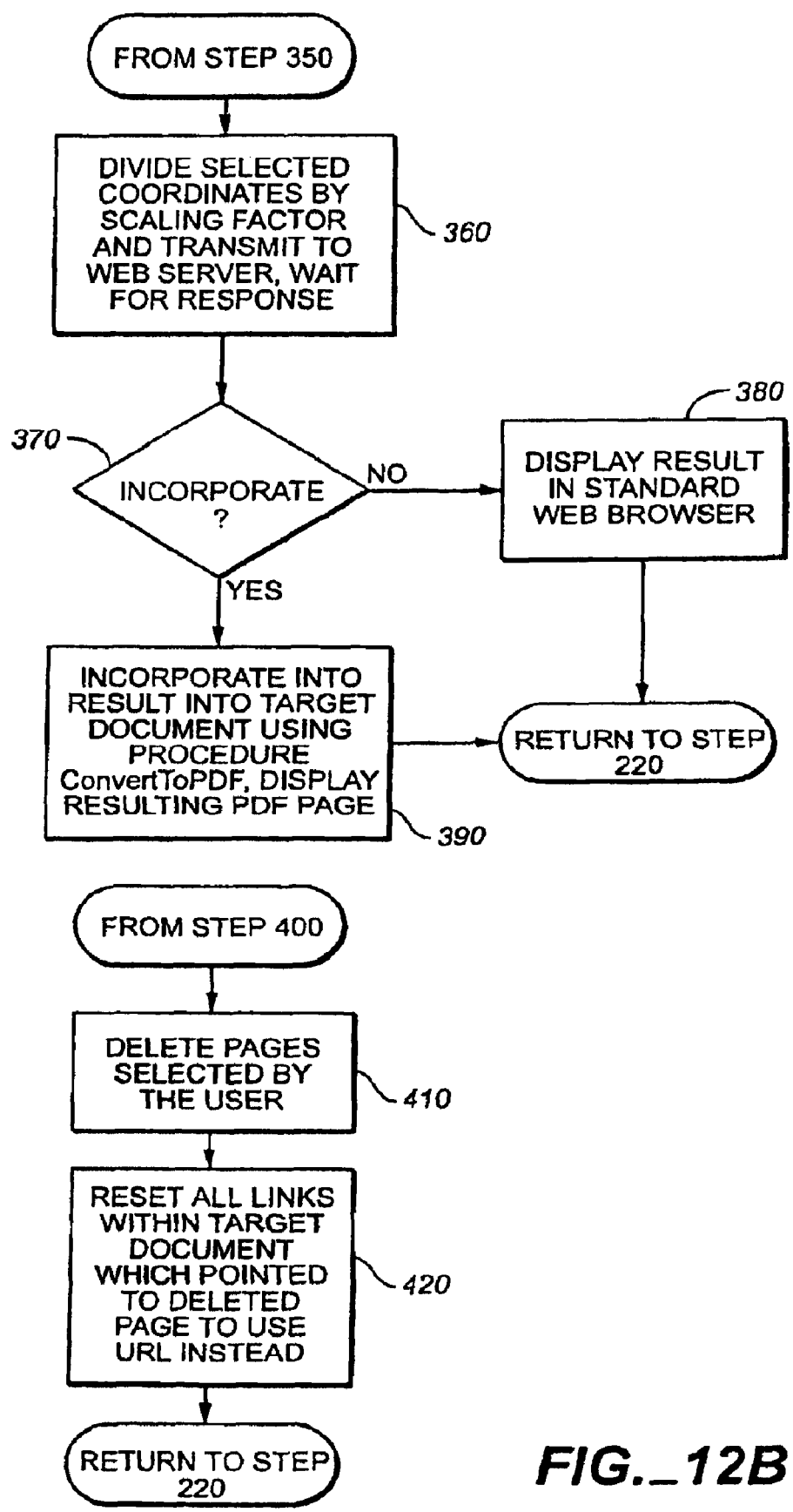
FIG._12B

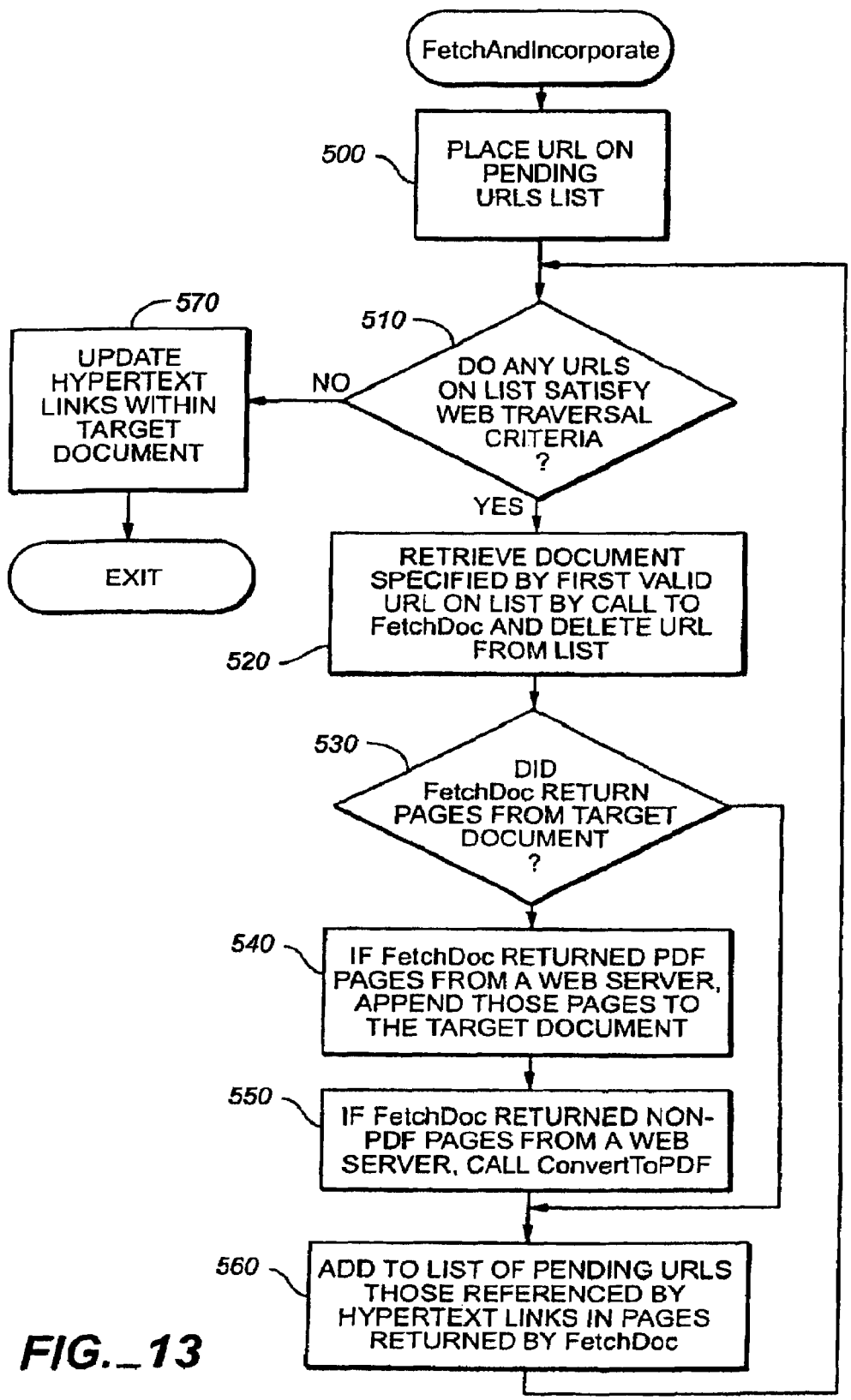
FIG._13

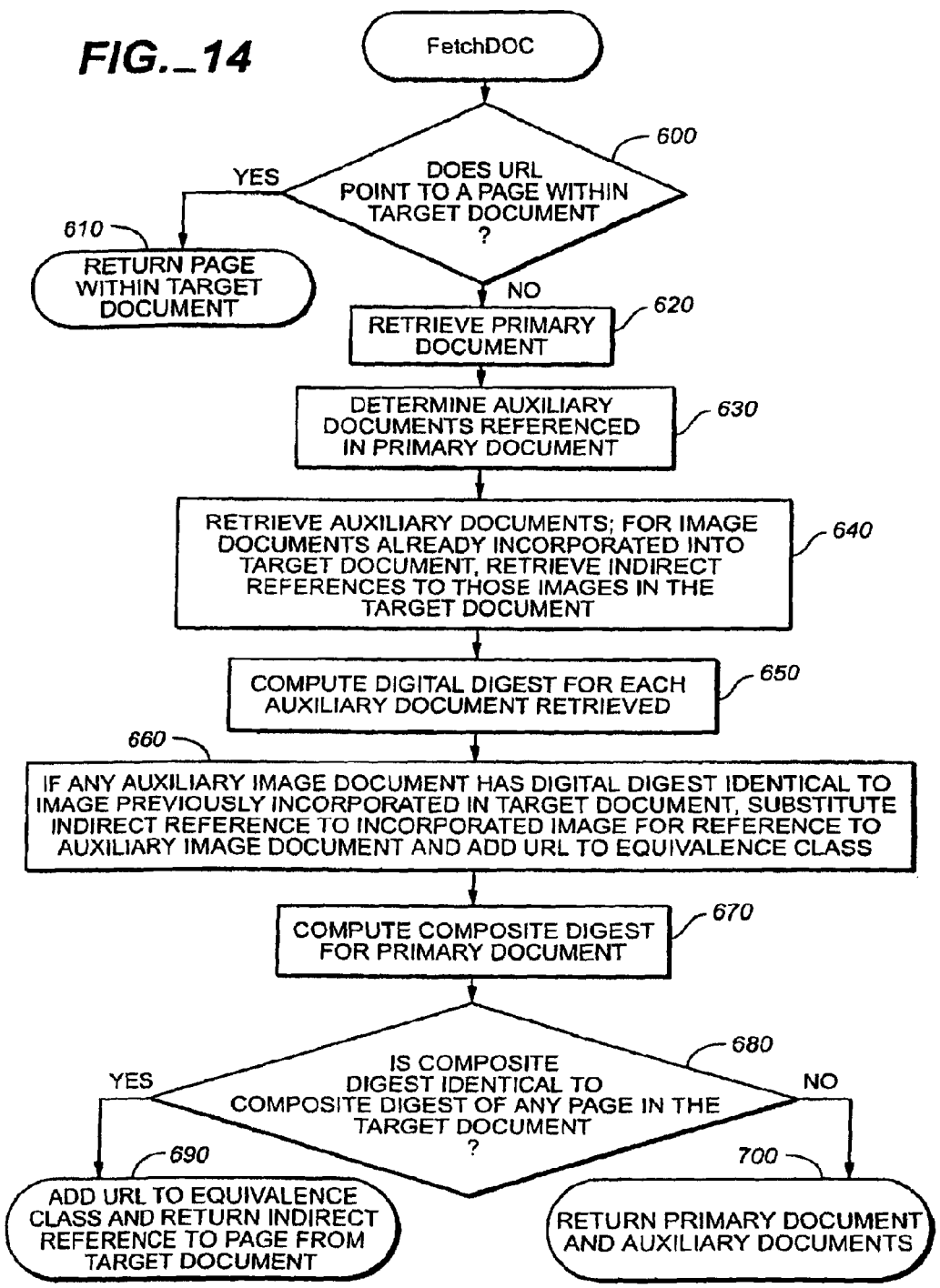
FIG._14

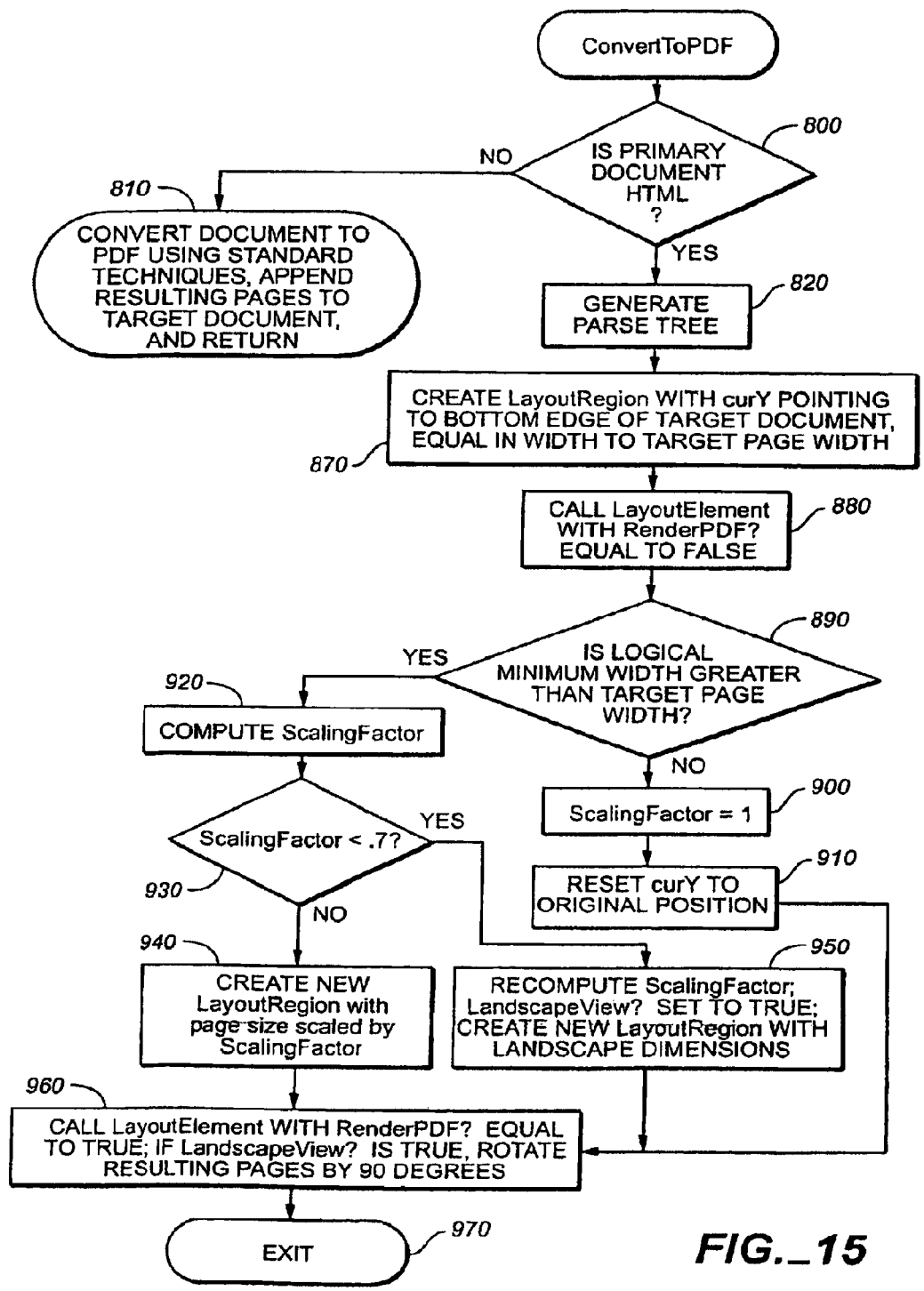
FIG._15

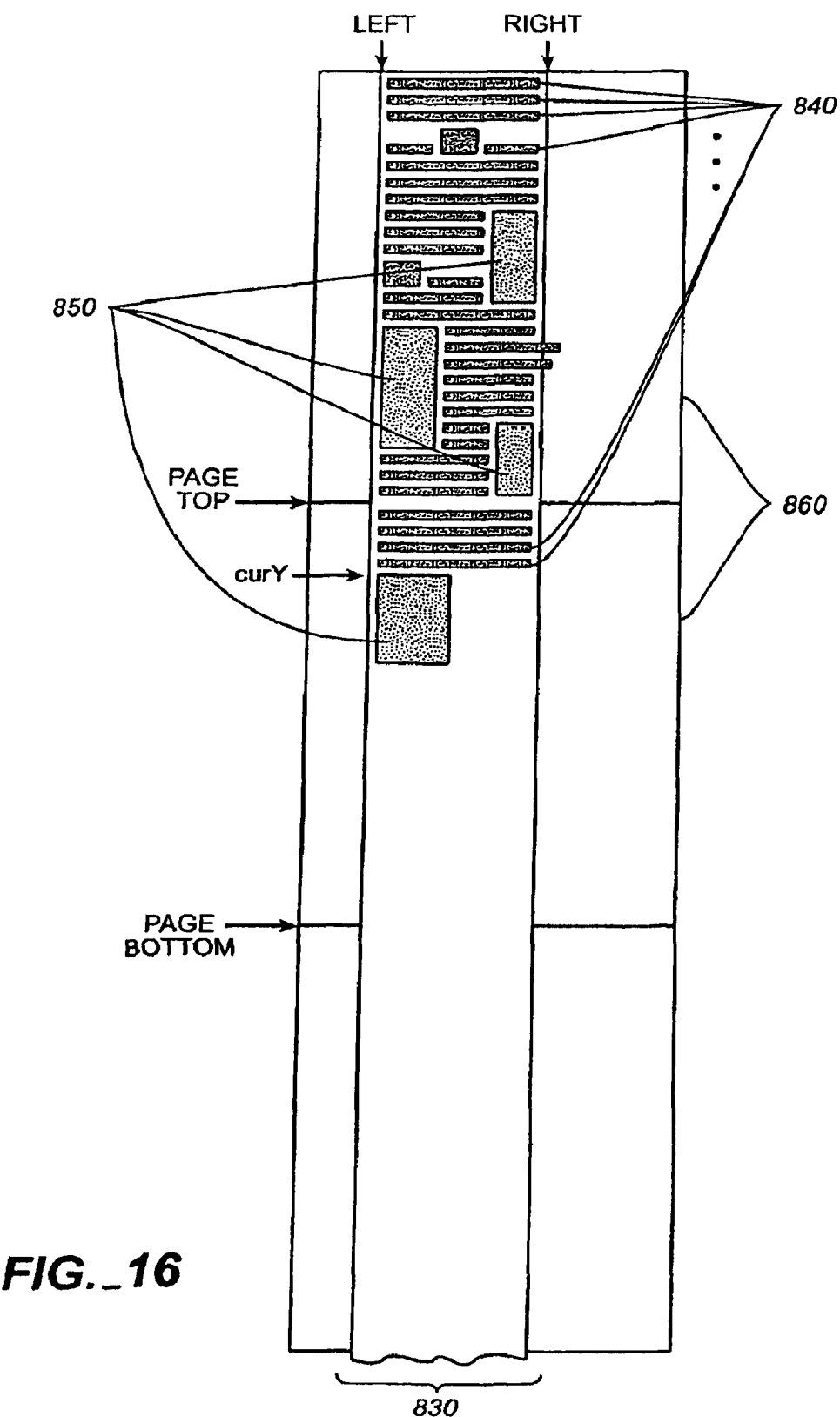
FIG._16

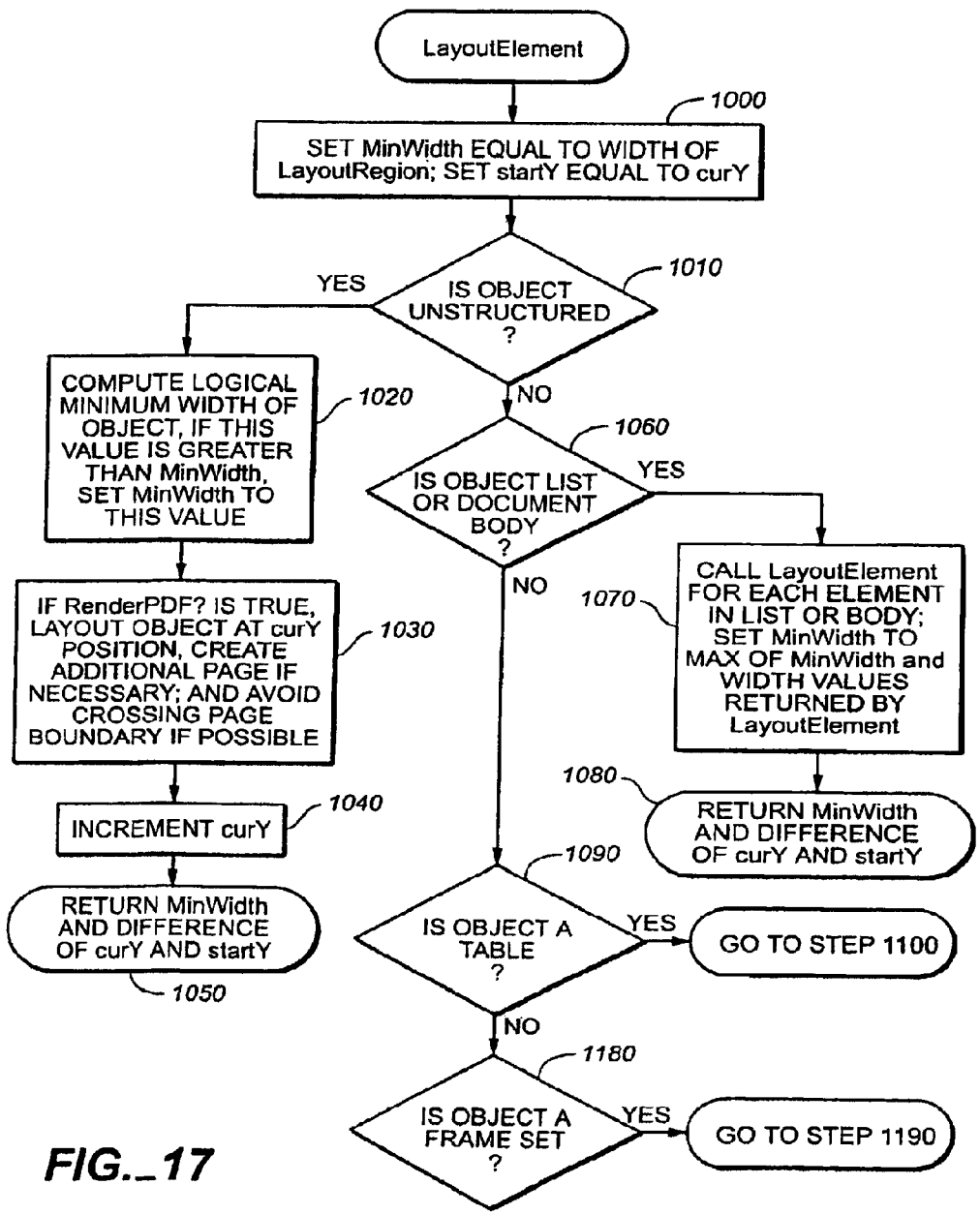
FIG._17

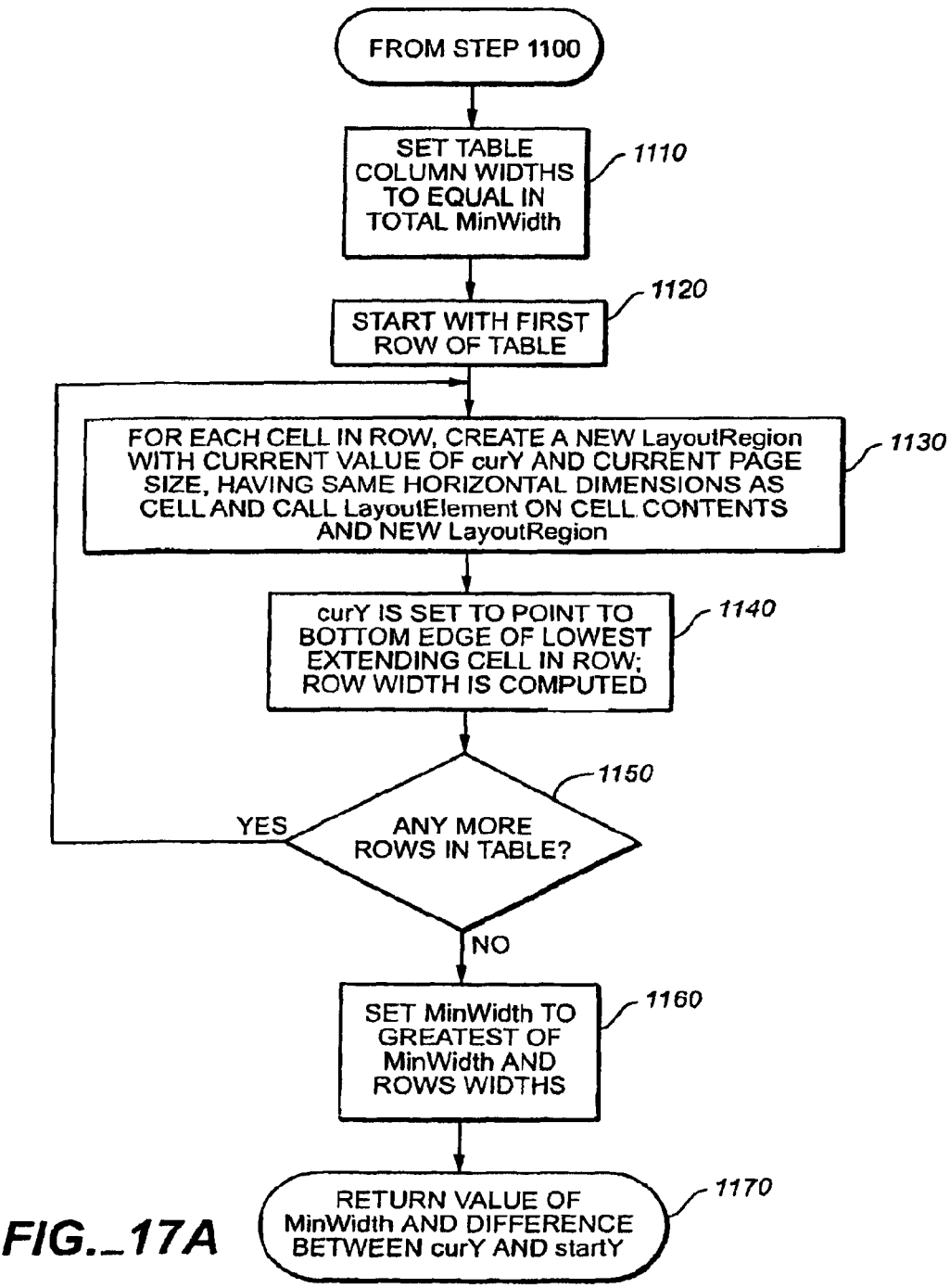
FIG._17A

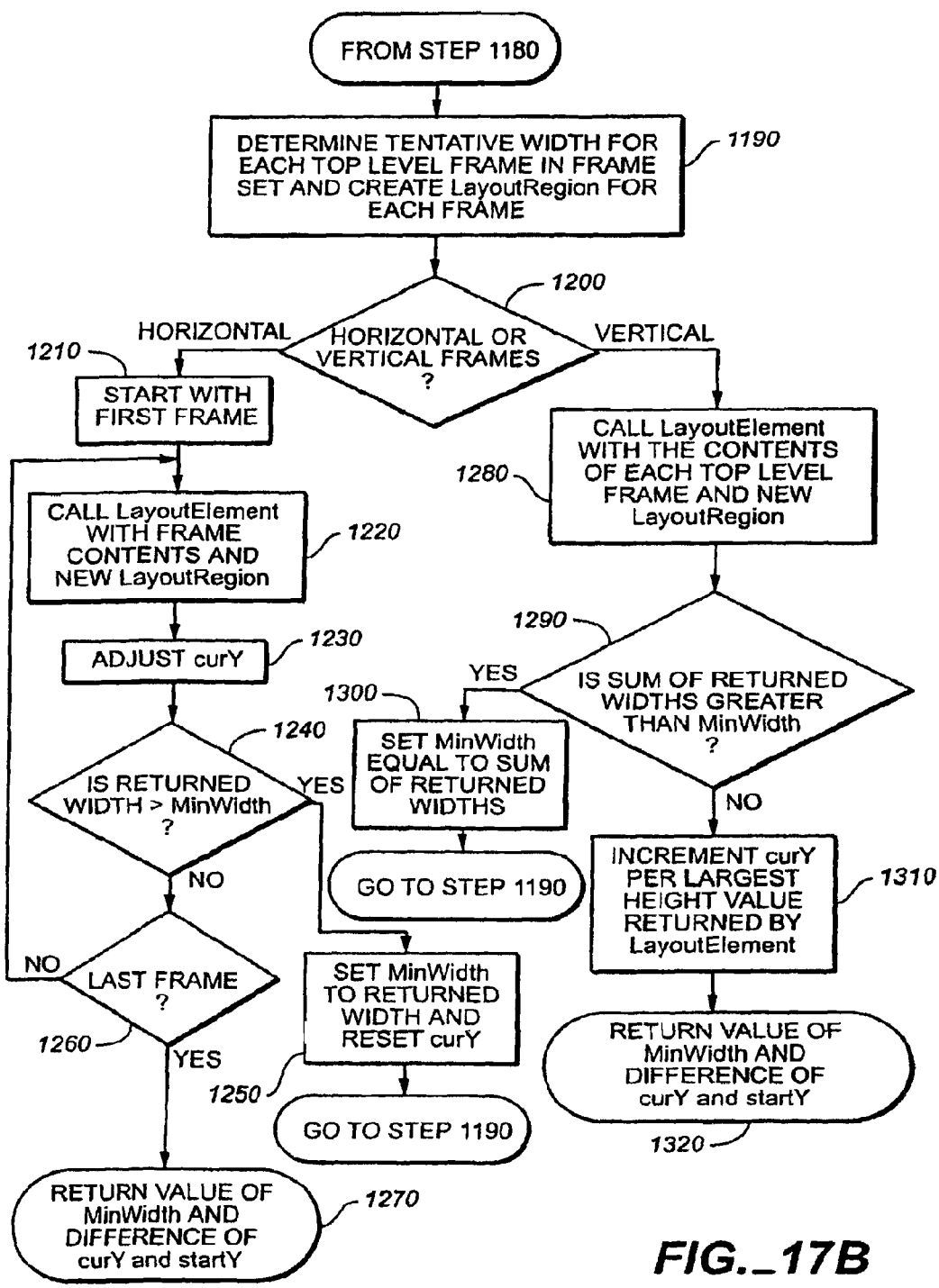
FIG._17B

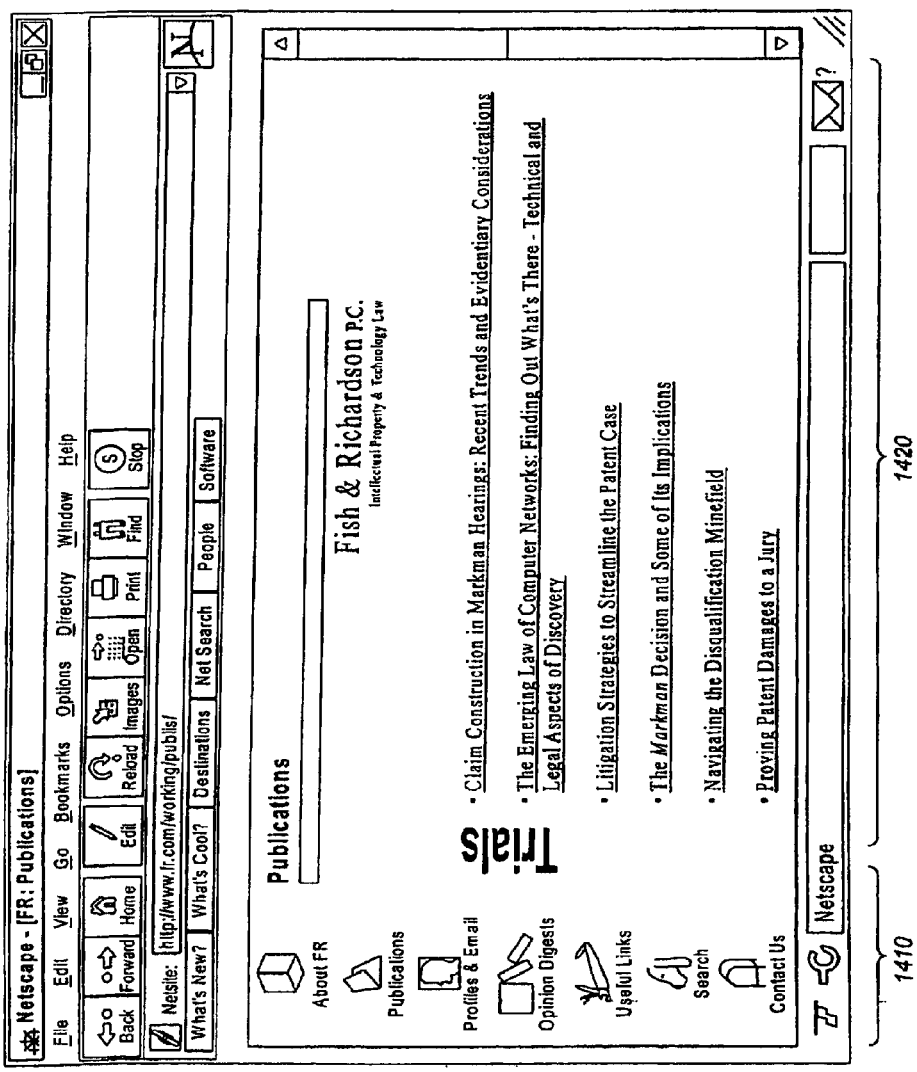
FIG._18
(PRIOR ART)

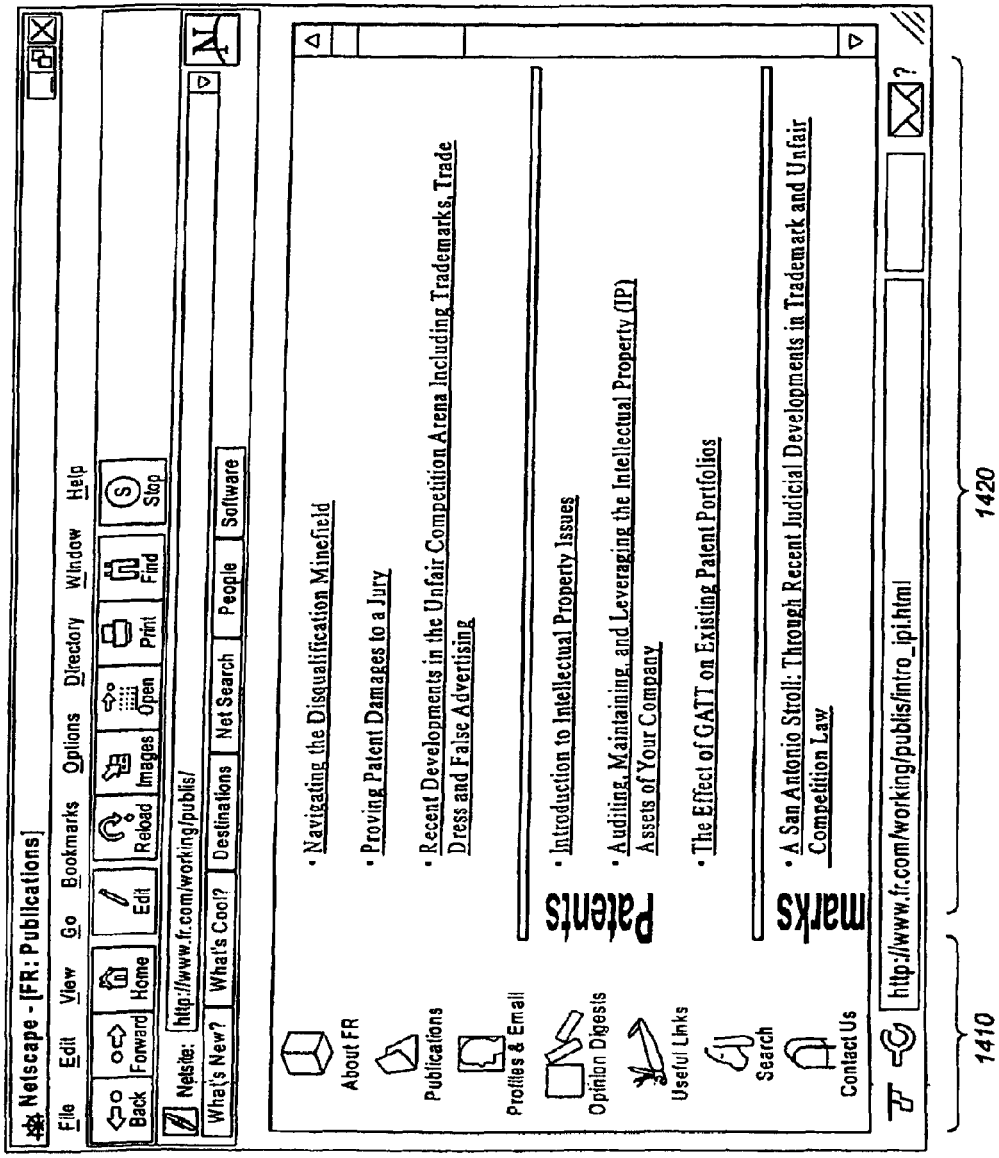
FIG._19
(PRIOR ART)

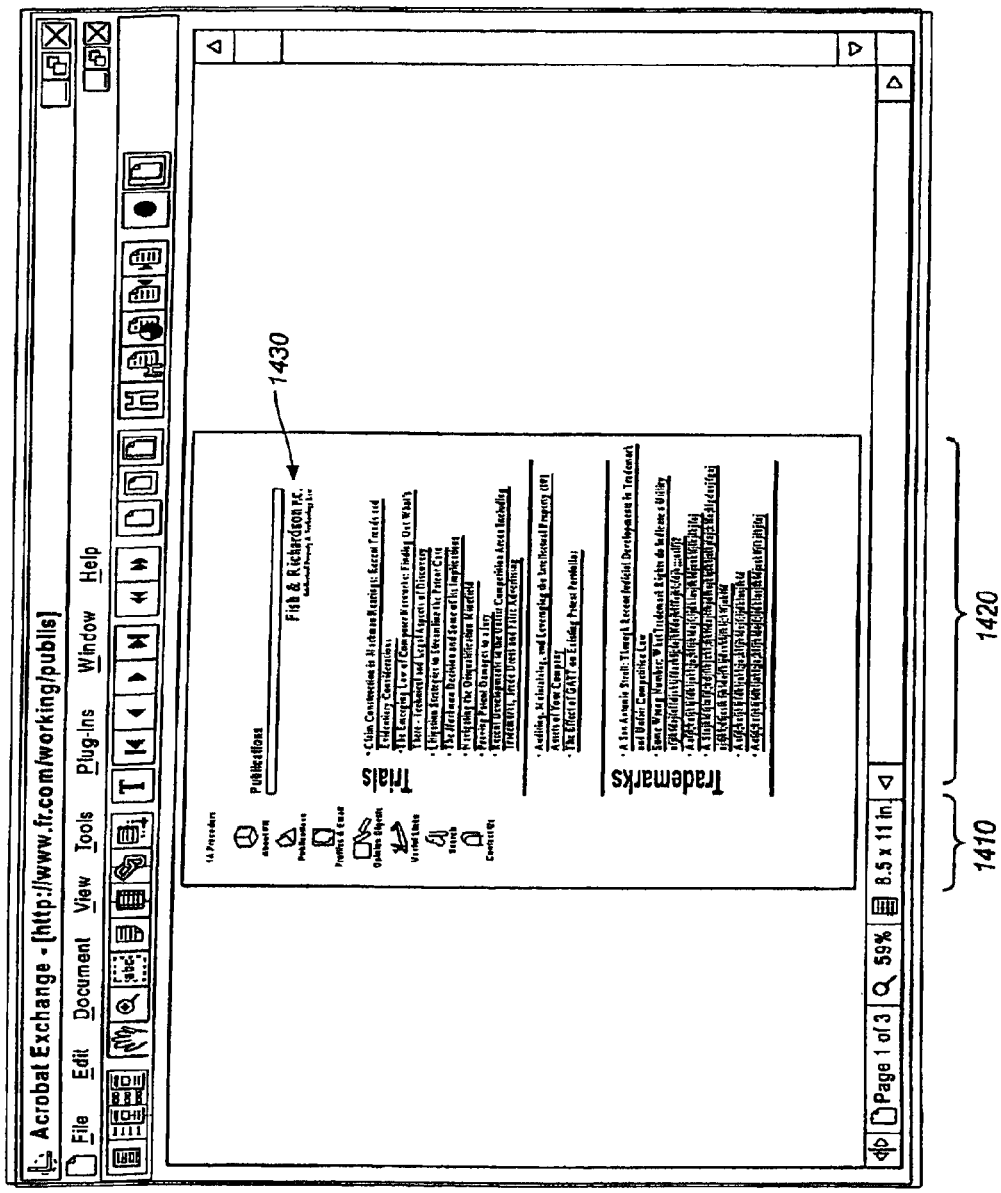
FIG._20
(PRIOR ART)

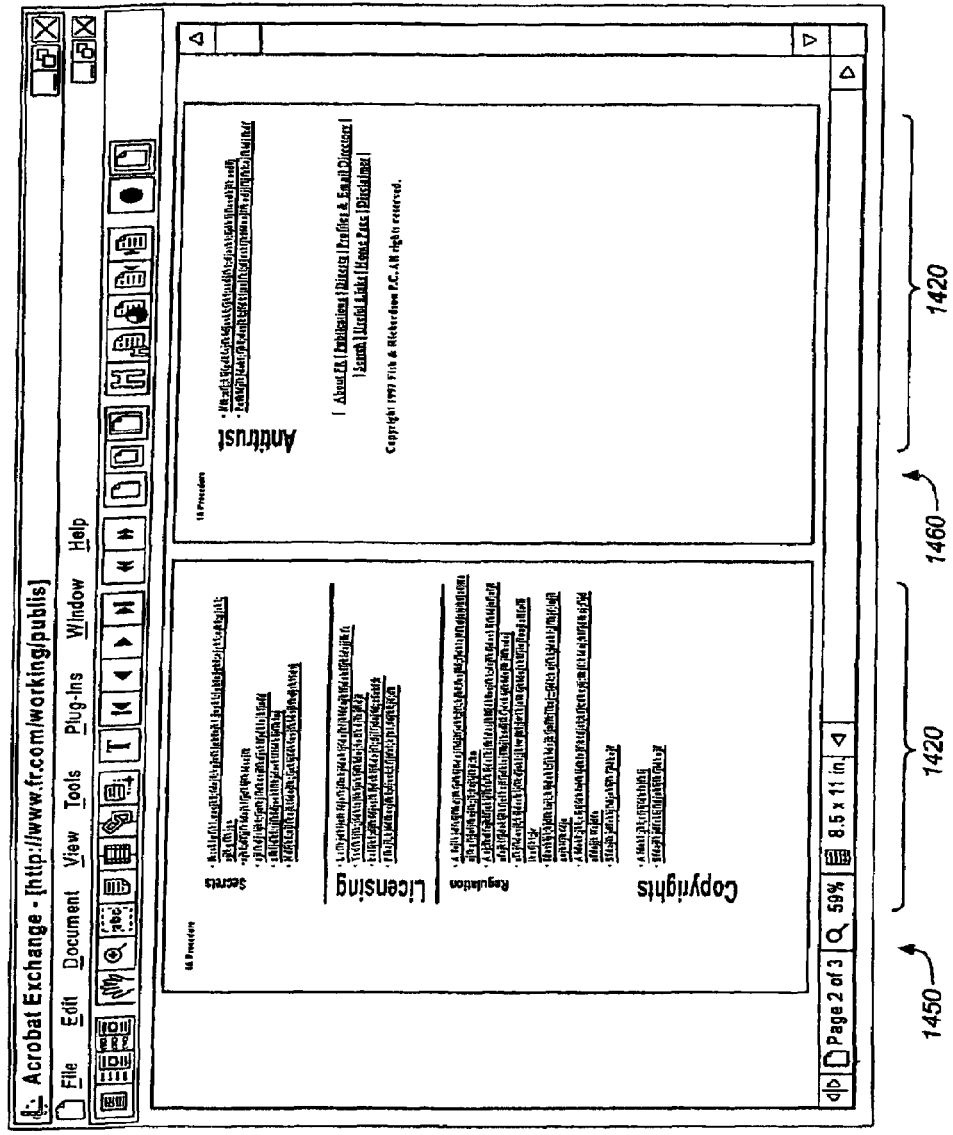
FIG._21
(PRIOR ART)

RETRIEVING DOCUMENTS TRANSITIVELY LINKED TO AN INITIAL DOCUMENT

CROSS-REFERENCE TO RELATED APPLICATIONS

This application is a divisional of U.S. patent application Ser. No. 08/970,743, filed Nov. 14, 1997, now U.S. Pat. No. 6,415,278, issued Jul. 2, 2002; and is a continuation of and claims priority to U.S. patent application Ser. No. 10/933,902, filed Sep. 3, 2004, which is a continuation of U.S. patent application Ser. No. 10/388,093, filed Mar. 13, 2003, now U.S. Pat. No. 6,789,080, issued Sep. 7, 2004, which is a continuation of U.S. patent application Ser. No. 10/071,762, filed Feb. 6, 2002, now U.S. Pat. No. 6,567,799, issued May 20, 2003, which is a divisional of U.S. patent application Ser. No. 08/970,743, filed Nov. 14, 1997, now U.S. Pat. No. 6,415,278, issued Jul. 2, 2002, the disclosures of which are incorporated herein by reference in their entirety.

BACKGROUND

The invention relates to capturing hypertext web pages for convenient viewing.

The World Wide Web ("the web") of the Internet has become in recent years a popular means of publishing documentary information. In particular, it is now common for users with access to the web to browse through collections of linked documents through the use of hypertext browsers, such as Netscape Navigator™ or Microsoft Internet Explorer™, whereby selection by the user of certain screen objects in a displayed document causes the contents of another document to be retrieved and displayed to the user.

Many of the documents on the web are encoded using a markup language known as the Hypertext Markup Language (HTML). HTML Version 3.2 with Frame Extensions is described in Graham, *HTML Sourcebook*, Third Edition, published by Wiley Computer Publishing, 1997. A markup language is a set of codes or tags that can be embedded within a document to describe how it should be displayed on a display device, such as a video screen or a printer. HTML is what is known as a "semantic" markup language. This means that, while it is possible to use HTML to dictate certain physical characteristics of a document (such as line spacing or font size), many HTML tags merely identify the logical features of the document, such as titles, paragraphs, lists, tables, and the like. The precise manner in which these logical features are displayed is then left to the browser software to determine at the time the document is displayed.

Because HTML tags often do not specify a fixed physical size of a document or its components, the precise appearance of a particular document displayed by a browser will often depend on the size of the browser window in which it is displayed. For example, FIGS. 1 and 2 show two views of the home web page of the US Patent and Trademark Office (specified by Uniform Resource Locator (URL) http://www.uspto.gov/ in September of 1997). In FIG. 2, the web browser window is significantly smaller than that in FIG. 1 and, as can be seen, the web page as seen through the two windows differs in its overall appearance, for example with respect to the width of the title 30 and list element 40.

One important feature of HTML is the ability, within an HTML document, to refer to external data resources. One way that such references are used within HTML is to identify auxiliary documents that are sources of content to be displayed as part of the display of the HTML document. For example, the HTML tag "IMG" specifies that the contents of a specified image document should be displayed within a portion of the display of the HTML document in which the IMG tag is found. Similarly, the tag "FRAME" within an HTML document specifies that the content of a specified document should be displayed within a particular frame of a frame set defined by the HTML document. The use of frames and frame sets within HTML is explained in more detail below.

HTML also features the ability to have a hypertext link within an HTML document. A hypertext link within an HTML document creates an association between a screen object (e.g., a word or an image) and an external resource. When the HTML document is displayed by a browser, a user may select the screen object, and the browser will respond by retrieving and displaying content from the external resource. A hypertext link may be specified within an HTML document with, for example, the HTML anchor tag with an HREF attribute.

The use of such external references within HTML facilitates distributed document storage on a wide area network (WAN). A large document may be broken up and stored as a set of smaller documents logically associated by external references. For example, it is common for the graphical images in an HTML document to be stored as separate documents (e.g., in the GIF or JPEG format). It is also common to store sections of a large text as separate documents, and to facilitate easy movement from one section to another through the use of hypertext links.

In addition, a set of pre-existing documents may be linked together with HTML tags to form a coherent whole. For example, an HTML document may be created containing hypertext links to a set of pre-existing documents relating to a common subject, thus facilitating the systematic review of such documents by a user.

A characteristic of HTML documents is that they are not paginated. That is, the displayed "height" of an HTML document is determined solely by the amount and arrangement of the screen objects defined within it, as displayed by the browser used to view it, and not by any fixed page size associated with the document. (Here "page size" does not necessarily refer to physical pages printed on paper, for example, but is simply a characteristic of an electronic document in which the content of the document is divided into a sequence of regions with fixed dimensions.) If the displayed document does not fit within the height of the browser window, the browser permits scrolling of the web page to permit additional content to be viewed. FIG. 3 shows the home web page of the US Patent and Trademark Office displayed within the same browser window as in FIG. 2, except that the page has been scrolled somewhat to reveal additional material.

A recent extension to HTML permits multiple scrollable and resizable "frames" to be displayed within a single browser window. A frame is defined by a special type of HTML document known as a "frame set". A frame set provides information giving the size and orientation of frames in a window, and specifies the contents of each frame. The contents of a frame may be either the contents of an HTML document, or a subsidiary frame set (i.e., a frame set, the entire contents of which appear within a single frame of the larger frame set). As with other HTML screen objects, the height or width of a frame may be specified in absolute or relative terms.

FIGS. 4, 5 and 6 illustrate the operation of frames in HTML. FIG. 4 shows a browser window displaying a frame set containing two frames. Frame 50 is a narrow vertical column on the left hand side of the screen. Frame 55 is a wider column to the right of frame 50. Frame 50 contains an HTML document that is as long as the browser window is high, while frame 55 contains a document that is longer than the browser window's height. As can be seen in FIG. 5, frame 55 can be scrolled independently of frame 50 to display the remainder of the HTML document contained within it.

In the above example, frame 50 is defined to have a fixed width of 115 pixels, whereas the width of frame 55 is defined relative to the width of frame 50—its width is set equal to the browser window's width, less the 115 pixels used by frame 50. As can be seen in FIG. 6, when the browser window is made smaller, frame 55 shrinks accordingly, while frame 50 remains at a fixed width.

As explained above, the ultimate appearance of an HTML document being displayed by a browser will usually depend on the size of the browser window (or frame) in which it is to be displayed. In general, a web browser will extract from an HTML document a series of screen objects (e.g., words, images, lists, frames or tables), and place them sequentially in rows on the screen. When a row has been filled, the next object is placed in a successive row. This process continues until all screen objects within the HTML document have been placed.

This general principle, however, is limited by the constraint that the width of the displayed HTML document cannot be narrower than the minimum width of the widest screen object contained within it. Under this constraint, if the minimum width of a screen object is wider than the width of the browser window, parts of the document will remain off screen (to the left or right) when viewed through the browser window, and a horizontal scroll bar will typically be displayed to permit the user to shift views of the document to the left or right.

HTML screen objects may have either a fixed or a variable width. For example, the width of a single word of text in an HTML document is fixed (given the font chosen by the browser in which to display it). Its width is determined by the characters in the word and the size font in which they will be displayed. Similarly, the width of a cell in an HTML table may be made fixed by explicitly specifying its width as a certain number of pixels.

By contrast, the width of a variable width screen object will vary, depending on the width of the browser window in which it appears. However, even a variable width screen object will have a minimum width. For example, the width of a paragraph of text will generally vary according to the size of the browser window; however, it can be no narrower than the widest word contained within the paragraph. Similarly, a table containing images may have cells whose widths are defined in relative terms, but the table nonetheless cannot be narrower than the sum of the widths of the images within its widest row.

This constraint is illustrated in FIGS. 7, 8, 9 and 10. In each of FIGS. 7, 8 and 9, an identical HTML document is displayed in a browser window 65. An excerpt of the underlying HTML code is shown in FIG. 10. Referring to FIGS. 7 and 10, the document being displayed includes a table 80 having two cells aligned to the top, one cell 85 containing a client-side image map and the other cell 90 containing the heading "US Patent and Trademark Office", a horizontal line, and an unordered list with the heading "New on the PTO site:". In FIG. 8, the window 65 is narrower than in FIG. 7, but wider than the minimum width of any object on the screen. Therefore, each line of the document is adjusted to be as wide as the window 65 and nothing is hidden from the user to the right of the browser window. By contrast, in FIG. 9, window 65 is narrower than the minimum width of table 80, since the fixed width of the image map in cell 85 plus the width of the widest word in cell 90 (the word "trademark") is greater than the width of the browser window 65. Therefore, the resulting display width of the document is wider than window 65, resulting in the rightmost part of the document being hidden from view.

While collections of visual display data on the web are typically stored as sets of linked HTML documents, it is also common and convenient for visual display data to be stored as a single document, having a fixed page size, using a physical markup language such as the portable document format (PDF). PDF is described in the publication Adobe Systems, Inc., Portable Document Format Reference Manual, Addison-Wesley Publishing Co., 1993.

SUMMARY

In general, in one aspect, the invention features a method for converting a semantic markup representation of a document into a physical markup representation of the document. The method includes calculating a logical minimum width equal to the minimum width required to display all screen objects within the document at their normal size, creating a physical markup representation of the document, the physical markup representation having a width at least as wide as the logical minimum width, and conforming the physical markup representation to a target size, including a target width, such that conforming the physical markup representation includes scaling the width of the physical markup representation by a scaling factor derived from the ratio of an element of the target size to the logical minimum width. Preferred embodiments of the invention include one or more of the following features. The physical markup representation is incorporated into a newly created document. The physical markup representation is incorporated into an existing document. The element of the target size is the target width. The physical markup representation is a paginated representation including pages each having a respective physical width and a respective physical height. The target size includes a target height. The target size is a standard paper size. The standard paper size is one of 8.5×11 inches, 8.5×14 inches, A4, A5, and 11×17 inches. The pages of the physical markup representation have the same aspect ratio as the target size. The height of the physical markup representation is scaled by the scaling factor. The page height of the physical markup representation is scaled by the scaling factor. The element of the target size is the target height. The pages of the physical markup representation are rotated by plus or minus 90 degrees. The ratio of the target width to the logical minimum width is tested whether it is less than a specified threshold. The document is a frame set specifying a plurality of frames. The document contains at least one hypertext link, the physical markup representation is displayed in a viewer, and an external document is accessed when a hypertext link is selected by a user from the displayed markup. The hypertext link is a server-side image map. The semantic markup representation is HTML.

The physical markup representation is PDF. After the physical markup representation is conformed to the target size, the physical markup representation is scaled by the inverse of scaling factor and the result is displayed in a viewer.

In general, in another aspect, the invention features a method for displaying hypertext data. The method includes displaying in a viewer a first document represented in a physical markup representation and containing at least one hypertext link, accessing an external document when a hypertext link is selected by a user from the displayed first document, converting the semantic markup representation of the external document into a physical markup representation, and incorporating the physical markup representation of the external document into the first document. Preferred embodiments of the invention include one or more of the following features. A hypertext link is modified to point to the physical markup representation of the external document. The original state of the hypertext link is saved. In response to an action deleting a portion of the first document, a hypertext link that pointed to the deleted portion is restored to its original state. The external document is digested to create a digest of the external document, and the digest of the external document is tested to determine whether the physical markup representation of the external document has already been incorporated into the first document. The external document comprises a primary document and one or more auxiliary documents. Each auxiliary document is digested to create a respective auxiliary document digest, and the digital digest of each auxiliary document is tested to determine whether the physical markup representation of the external document has already been incorporated into the first document. The digital digest is a compound digest.

In general, in another aspect, the invention features a method for creating a distinguishing identifier of a collection of data comprising a primary document and one or more auxiliary documents. The method includes digesting each auxiliary document to create a respective auxiliary document digest and creating a distinguishing identifier by digesting a concatenation of the primary document with all auxiliary document digests. Preferred embodiments of the invention include one or more of the following features. A digital digest algorithm is applied. The digital digest algorithm is the MD5 Message Digest Algorithm.

In general, in another aspect, the invention features a method for retrieving documents transitively linked to an initial document on a hierarchical file system. The method includes retrieving the initial document and retrieving only those other documents for which there is a transitive link from the initial document to the other document and for which the transitive link includes documents which are all within the same directory path as the initial document. Preferred embodiments of the invention include one or more of the following features. The hierarchical file system is distributed on a network. The hierarchical file system is distributed on an internet.

In general, in another aspect, the invention features a computer program, residing on a computer-readable medium, for converting a semantic markup representation of a document into a physical markup representation of the document, having instructions for causing a computer to calculate a logical minimum width equal to the minimum width required to display all screen objects within the document at their normal size, create a physical markup representation of the document, the physical markup representation having a width at least as wide as the logical minimum width, and conform the physical markup representation to a target size, including a target width, the instructions for causing a computer to conform the physical markup representation including instructions for causing a computer to scale the width of the physical markup representation by a scaling factor derived from the ratio of an element of the target size to the logical minimum width. Preferred embodiments of the invention include one or more of the following features. The program includes instructions for causing a computer to incorporate the physical markup representation into a newly created document. The program includes instructions for causing a computer to incorporate the physical markup representation into an existing document. The element of the target size is the target width. The physical markup representation is a paginated representation including pages each having a respective physical width and a respective physical height. The target size includes a target height. The target size is a standard paper size. The standard paper size is one of 8.5×11 inches, 8.5×14 inches, A4, A5, and 11×17 inches. The pages of the physical markup representation have the same aspect ratio as the target size. The program includes instructions for causing a computer to scale the height of the physical markup representation by the scaling factor. The program includes instructions for causing a computer to scale the page height of the physical markup representation by the scaling factor. The element of the target size is the target height. The program includes instructions for causing a computer to rotate the pages of the physical markup representation by plus or minus 90 degrees. The program includes instructions for causing a computer to test whether the ratio of the target width to the logical minimum width is less than a specified threshold. The document is a frame set specifying a plurality of frames. The document contains at least one hypertext link and the program includes instructions for causing a computer to display the physical markup representation in a viewer and access an external document when a hypertext link is selected by a user from the displayed markup. The hypertext link is a server-side image map. The semantic markup representation is HTML. The physical markup representation is PDF. The program includes instructions for causing a computer to, after conforming the physical markup representation to the target size, scale the physical markup representation by the inverse of scaling factor and display the result in a viewer. The program includes instructions for causing a computer to display in a viewer a first document represented in a physical markup representation and containing at least one hypertext link access an external document when a hypertext link is selected by a user from the displayed first document convert the semantic markup representation of the external document into a physical markup representation and incorporate the physical markup representation of the external document into the first document. The program includes instructions for causing a computer to modify a hypertext link to point to the physical markup representation of the external document. The program includes instructions for causing a computer to save the original state of the hypertext link. The program includes instructions for causing a computer to, in response to an action deleting a portion of the first document, restore a hypertext link that pointed to the deleted portion to its original state. The program includes instructions for causing a computer to digest the external document to create a digest of the external document, and test the digest of the external document to determine whether the physical markup representation of the external document has already been incorporated into the first document. The external document comprises a primary document and one or more auxiliary documents. The program includes instructions for causing a computer to digest each auxiliary document to create a respective auxiliary document digest and test the digital digest of each auxiliary document to determine whether the physical markup representation of the external document has already been incorporated into the first document. The digital digest is a compound digest.

In general, in another aspect, the invention features a computer program, residing on a computer readable medium, for creating a distinguishing identifier of a collection of data comprising a primary document and one or more auxiliary documents having instructions for causing a computer to digest each auxiliary document to create a respective auxiliary document digest and create a distinguishing identifier by digesting a concatenation of the primary document with all auxiliary document digests. Preferred embodiments of the invention include one or more of the following features. The program includes instructions for causing a computer to apply a digital digest algorithm. The digital digest algorithm is the MD5 Message Digest Algorithm.

In general, in another aspect, the invention features a computer program, residing on a computer readable medium, for retrieving documents transitively linked to an initial document on a hierarchical file system, having instructions for causing a computer to retrieve the initial document and retrieve only those other documents for which there is a transitive link from the initial document to the other document and for which the transitive link includes documents which are all within the same directory path as the initial document. Preferred embodiments of the invention include one or more of the following features. The hierarchical file system is distributed on a network. The hierarchical file system is distributed on an internet.

Among the advantages of the invention are one or more of the following. Web pages written in a semantic markup language, such as HTML, can be integrated into a single paginated document described in a physical markup language, such as PDF. Web pages can be converted to a format having fixed page dimensions, without losing information because of space constraints. A virtually unique single identifier can be created for a primary document and associated auxiliary documents. All of the documents that are linked to a document and also in the same directory path can be retrieved from a file system.

Other features and advantages of the invention will become apparent from the following description and from the claims.

DESCRIPTION OF DRAWINGS

FIG. 1 is a view of a web page displayed in a conventional web browser.

FIG. 2 is a view of a web page displayed in a conventional web browser.

FIG. 3 is a view of a web page displayed in a conventional web browser.

FIG. 4 is a view of a web page containing frames in a conventional web browser.

FIG. 5 is a view of a web page containing frames in a conventional web browser.

FIG. 6 is a view of a web page containing frames in a conventional web browser.

FIG. 7 is a view of a web page displayed in a conventional web browser.

FIG. 8 is a view of a web page displayed in a conventional web browser.

FIG. 9 is a view of a web page displayed in a conventional web browser.

FIG. 10 shows a portion of the underlying HTML code for the web page displayed in FIGS. 7-9.

FIG. 11 is a block diagram of a computer system programmed in accordance with the present invention.

FIGS. 12, 12a and 12b are a flowchart of a method of incorporating web pages into a single paginated document.

FIG. 13 is a flowchart showing steps of a routine FetchAndIncorporate.

FIG. 14 is a flowchart showing steps of a routine FetchDoc.

FIG. 15 is a flowchart showing steps of a routine ConvertToPDF.

FIG. 16 shows the logical relationship between a LayoutRegion and content of an associated PDF document.

FIGS. 17, 17a, and 17b are a flowchart showing steps taken by a routine LayoutElement.

FIG. 18 is a view of a web page displayed in a conventional web browser.

FIG. 19 is a view of a web page displayed in a conventional web browser.

FIG. 20 shows a PDF page produced by the present invention.

FIG. 21 shows PDF pages produced by the present invention.

Like reference symbols in the various drawings indicate like elements.

DETAILED DESCRIPTION

Referring to FIG. 11, a user computer 100 running client software is connected over a communications link 102 to web servers, such as web server 140. Web servers are linked (statically or dynamically) to data stores, such as data store 142, containing web pages, such as page 144. The client software (which may include one or more separate programs, as well as plug-in modules and operating system extensions) typically displays information on a display device such as a monitor 104 and receives user input from a keyboard (not shown) and a cursor positioning device such as a mouse 106. The computer 100 is generally programmed so that movement by a user of the mouse 106 results in corresponding movement of a displayed cursor graphic on the display 104.

The programming of computer 100 includes an interface 108 that receives position information from the mouse 106 and provides it to applications programs running on computer 100. Among such applications programs are a web browser 110, and a PDF viewer 120. Also running on computer 100 is a web page integrator 135, which may be part of the PDF viewer 120. In response to a request from the user, the PDF viewer may request the web page integrator 135 to retrieve, from one or more web servers (such as web server 140), an initial document specified by a URL supplied by the user, and other documents which are linked, directly or indirectly, to the initial document. When the requested documents are retrieved, the web page integrator integrates them into a single PDF document, which is then displayed by the PDF viewer 120.

The PDF document which is displayed by the PDF viewer may have hypertext links to web pages, as well as to internal pages within the PDF document. When the user selects a hypertext link in the PDF document, e.g., with the mouse, if the link is to a page within the PDF document, that page is displayed by the PDF viewer. However, if the hypertext link is to a web page, that page is either displayed by the browser, or integrated into the PDF document and displayed by the PDF viewer, depending on a mode set by the user.

FIGS. 12, 12a, and 12b are a flowchart of a method of incorporating web pages into a single paginated document, which will be described as implemented in a programmed computer system. First, the system queries the user to provide the name of an existing PDF document, or a URL along with web traversal criteria (step 200). If the user provides the name of a PDF document, the document becomes the "target document" (step 210). The target document is displayed in the PDF viewer and user input is awaited (step 220). If the user provides a URL with web traversal criteria, then a new, empty, PDF document is created. This document becomes the target document. Parameters of the target document are set which specify a target width and a target height of pages within the document (collectively the "target size" of the document), according to either a default value or input from the user. Then, the routine FetchAndIncorporate is called, which incorporates a starting document specified by the URL, as well as other documents which are linked to the starting document and which satisfy the web traversal criteria, into the target document (step 230). The target document is then displayed by the PDF viewer and the system waits for user input (step 220).

The pages of the target document are normally displayed in their target size, i.e., the size of the pages as specified in their PDF encoding. Upon request of the user, however, the pages may be displayed in their "natural size." By the "natural size" of a page we mean a size having the same aspect ratio as the target size, but having a width equal to the greater of the target width and the minimum width required to display in a browser the web page from which the page was incorporated.

If the user selects a hypertext link (step 235), then, and referring now to FIG. 12*a*, the link is examined to determine whether it points to a document which has already been incorporated into the target document (step 240), and if so, the page of the target document corresponding to the previously incorporated document is displayed by the PDF viewer (step 250). Otherwise, the value of a user-settable flag Incorporate? is checked (step 260) and one of the following steps is taken.

If the Incorporate? flag is FALSE, the URL specified by the hypertext link is provided to a standard web browser program with instructions to display the document corresponding to the URL (step 270).

If the Incorporate? flag is TRUE, FetchAndIncorporate is called with the URL, and with web traversal criteria specifying that only the document associated with the URL be retrieved (step 280). This results in the creation of one or more pages in the target document corresponding to the document specified by the URL. The first of these pages is then displayed by the PDF viewer (step 290).

Referring again to FIG. 12, if the user requests submission of a form contained within the target document (step 300), then, and referring to FIG. 12*a*, the contents of the form are submitted to the appropriate server (step 310). Any web document received from the server in response to the form submission is either displayed in the web browser (step 330) or incorporated into the target document by the procedure ConvertToPDF (described in more detail below) and displayed by the PDF viewer (step 340), according to the value of the Integrate? flag (step 320).

Referring again to FIG. 12, the following steps are taken if the user selects a point on a server-side image map within the target document (step 350). It should be noted that a server-side image map is an image displayed in a browser such that if the user selects any point within the image using a pointing device such as a mouse, the coordinates of that point within the image are submitted to a specified server, which responds by transmitting a document back to the browser. First, and referring now to FIG. 12*b*, the coordinates selected by the user are divided by the value of a variable ScalingFactor associated with the currently displayed page (step 360). ScalingFactor indicates the amount, if any, by which the dimensions of the original server-side image map were reduced in order to fit it on a page within the target document. The resulting coordinate values are then transmitted to the server (step 360), and, according to the value of the Incorporate? flag (step 370), the document transmitted back by the server is either displayed by the web browser (step 380), or is incorporated into the target document and displayed by the PDF viewer (step 390).

Referring again to FIG. 12, if the user requests deletion of a page from the target document (step 400), then, and referring now to FIG. 12*b*, the page is deleted (step 410), and all hypertext links within the document which had pointed to that page are reset to be external links (step 420).

When the user request has been processed, control returns to step 220, where further requests from the user are awaited.

FIG. 13 is a flowchart showing the steps of the routine FetchAndIncorporate, which retrieves a collection of documents linked from a given URL into the target document. First, the URL is placed on a list of pending URLs (step 500). Then, the list is checked to determine whether any of the URLs on it is valid, according to criteria specified by the user (step 510).

One web traversal criterion which may be specified by the user is a maximum depth criterion. This criterion limits the depth of recursive calls to FetchAndIncorporate, and thus limits the "link distance" between the initially retrieved document and subsequently retrieved documents to be incorporated into the target document.

Another criterion that may be specified by the user is a "stay on server" criterion. When this criterion is set, only documents with URLs indicating the same server as the initially retrieved document are retrieved.

Another criterion that may be set by the user is a "same path" criterion. When this criterion is set, only documents with URLs indicating the same file system directory (or subdirectories of that directory) as the initially retrieved document are retrieved.

If there are valid URLs on the list, the document identified by the first valid URL on this list is retrieved by calling the routine FetchDoc (step 520). FetchDoc returns either a set of pages from the target document, or a document retrieved from a web server with zero or more associated auxiliary documents. If FetchDoc returns pages from the target document (step 530), this indicates that the requested document has already been incorporated into the target document, and the routine continues at step 560.

If FetchDoc returns a document containing PDF pages from a web server, those pages are appended to the end of the target document (step 540).

If FetchDoc returns a non-PDF document (possibly with associated auxiliary documents) from a web server, the routine ConvertToPDF is called (step 550). ConvertToPDF takes as arguments a non-PDF document and its auxiliary documents and creates corresponding PDF pages which are appended to the target document.

Next, all of the URLs referenced by the hypertext links in the documents returned by FetchDoc are added to the list of pending URLs (step 560), and control returns to step 510.

In this manner, all documents linked to the target documents, and all documents linked to those documents, and so forth, are retrieved, subject to the web traversal criteria specified by the user. We use the term "transitively linked" to describe two documents for which there is a series of one or more links connecting them.

If at any time the list of pending URLs contains no valid URLs, hypertext links within the target document are modified so those hypertext links linking to documents which have been incorporated into the target document (referred to here as "internal links"), now point to the corresponding page in the target document, rather than to the corresponding HTML document from the web (step 570). The original link information (i.e., the URL pointing to a web based data resource) is, however, retained. In the event that the internal link becomes invalid (e.g., if the page to which it points is deleted from the target document), the original link information can be used to access data from the Web.

FIG. 14 is a flowchart showing the steps taken by the routine FetchDoc. The specified URL is checked to see whether it corresponds to a document from the web that has already been incorporated into a page of the target document (step 600). A URL may so correspond because it refers to a document that was previously incorporated as a page of the target document, or because it was previously discovered to be equivalent, as explained in more detail below, to a URL which refers to a document that was incorporated into a page of the target document. If so, the corresponding pages from the target document are returned (step 610).

If not, the requested document (referred to here as the "primary document") is retrieved from the web server (step 620). The primary document is scanned, and the URLs of all auxiliary documents (if any) to be included in the display of the primary document are noted (step 630). In the case of an HTML document that is not a frame set, the auxiliary documents may include image documents. In the case of a frame set, these auxiliary documents include documents that provide the content of frames.

For each URL referring to an auxiliary document, if the auxiliary document is an image document, it is determined whether the URL refers to a document that has already been retrieved into pages of the target document. This is done by comparing the URL to a list of URLs referencing image documents previously incorporated into the target document. A URL may appear on this list because it refers to an image document that was previously incorporated into the target document, or because it was previously discovered to be equivalent, as explained in more detail below, to a URL which refers to an image document that was previously incorporated into the target document. If so, indirect object references to the corresponding images are retrieved from the target document (step 640). Otherwise, the auxiliary document identified by the URL is retrieved from the web (step 640). For each auxiliary document retrieved from the web, a numerical "digest" is created using a non-linear digesting algorithm such as the MD5 digest algorithm described in the document RFC 1321, *The MD5 Message Digest Algorithm*, published by the Internet Engineering Task Force (step 650). The digest created by applying MD5 to the document is a numerical value that is exceedingly unlikely to be produced by applying MD5 to a different document. It thus serves as a virtually unique identifying "signature" for the document.

For each auxiliary document which is an image document, the digest value is compared to digest values for documents which have been previously incorporated into pages of the target document. If a match is found, the retrieved image document is discarded, an indirect object reference to the image is retrieved from the target document instead, and the URL for the auxiliary document is placed in an equivalence class with the URL associated with the matched image (step 660). Optionally, the URLs in an equivalence class may be marked with expiration dates, indicating that they are to be removed from the equivalence class after that date. This may be done so that URLs that refer to resources likely to change over time do not become "stale".

It should be noted that it is common on the web for lexicographically distinct URLs to point to the same or identical content. By using numerical digests, space is saved by avoiding the incorporation of duplicate pages and images into the target document.

Once all of the auxiliary documents have been retrieved (either from the web or as indirect references to previously incorporated content in the target document, a new digest is created by applying the digest algorithm to the concatenation of the digests of all of the auxiliary documents with the contents of the primary document (step 670). The resulting "composite digest" is the digest of the primary document.

The use of a composite digest of the primary document rather than a simple digest (i.e., a digest of the contents of the primary document only) provides the advantage of distinguishing between primary documents which are textually identical but nonetheless result in the display of different content. For example, an auxiliary document in an HTML document may be specified as a relative reference. That is, the URL may specify a document name without specifying, for instance, a server name or a directory name. Such a relative reference is interpreted as a reference to a document in the same directory and on the same server as the document from which the reference is made. Thus two primary documents having identical relative references to auxiliary documents may actually reference different auxiliary documents if they are found on different hosts.

Primary documents that are textually identical may also appear differently to the viewer if they are retrieved at different times. This is because the contents of any auxiliary documents referenced by the document may have changed over time.

Use of a composite digest allows the content of both the primary document and its auxiliary documents to be efficiently compared with existing target document pages before the decision is made whether to treat the primary document as duplicative of those pages.

The compound digest of the primary document is then checked to see if it corresponds to the digest of any web document previously incorporated as a page or pages of the target document (step 680). If so, the primary document is discarded, the pages of the target document corresponding to the previously incorporated web document are returned, and the URL for the primary document is placed in an equivalence class with the URL associated with the matched previously incorporated document (step 660). Otherwise, the primary document is returned, along with its associated auxiliary documents (step 700).

FIG. 15 is a flowchart showing the steps of the routine ConvertToPDF. ConvertToPDF takes as arguments a non-PDF document and its auxiliary documents. First, the primary document is checked to see if it is an HTML document (step 800). If it is not (i.e., it is some other type of document such as an image document), then it is incorporated into the target document using ordinary techniques (step 810).

If the primary document is an HTML document, the primary document and auxiliary documents are parsed into a parse tree of screen objects (e.g., document bodies, tables, lists, images, and paragraphs), using standard parsing techniques (step 820). Such techniques are described, for example, in Aho & Ullman, *Principles of Compiler Design*, Addison-Wesley, 1977.

Next, a LayoutRegion data structure is created. The LayoutRegion data structure represents a fixed width stripe through a specific PDF document. The LayoutRegion also includes a pointer curY, which specifies the current vertical position within the document at which layout is to take place. The LayoutRegion also contains page size information, indicating the width and height of PDF pages to which it refers. The LayoutRegion also contains a list of so-called "floating images" that are defined to occupy a fixed vertical location at either the left or the right edge of the LayoutRegion, and around which other screen objects flow. FIG. 16 shows schematically a layout region 830 that has been used to lay out several lines of text 840 and to place four images 850 in two successive PDF pages 860.

Referring again to FIG. 15, the LayoutRegion is created so that curY points to the bottommost edge of the last existing page of the target document. By convention, any PDF screen object placed at this location will appear at the very top of the following page. The left and right extents of the LayoutRegion are set equal to the desired width of pages within the target document. The page height and width information is set equal to the page dimensions of the target document (step 870).

Next, the routine LayoutElement is called. The routine LayoutElement takes as arguments an HTML screen object (e.g., a frame set, a table, a document, a paragraph, or an image), a LayoutRegion, and a flag RenderPDF?. LayoutElement returns the dimensions, i.e., width and height, actually required to layout the screen object. When RenderPDF? is TRUE, LayoutElement also attempts to create content within the target document corresponding to the HTML object. This process is explained in more detail below.

LayoutElement is initially called with the newly created parse tree of the primary HTML document and its auxiliary documents, the newly created LayoutRegion, and a Render-PDF? value of FALSE as arguments (step 880). When RenderPDF? is FALSE, LayoutElement calculates the minimum width and height required to completely display all of the screen objects specified within the parse tree at their normal size. We refer to the width as the "logical minimum width" of the HTML object represented by the parse tree.

The width value returned by LayoutElement is then compared to the target width of the target document (step 890). If the returned width value is less than or equal to the width of the target PDF pages, then the variable ScalingFactor is set equal to one (step 900), and the value of curY in the LayoutRegion is reset to equal the bottom edge of the last page of the target document (step 910).

If the width value returned by LayoutElement is greater than the width of the target PDF pages, the following steps are taken. ScalingFactor is computed by dividing the target width of the target document by the returned width value (step 920). If ScalingFactor is greater than about 0.7 (step 930), a new LayoutRegion is created in which page height and width are defined to equal the page dimensions of the target PDF pages divided by ScalingFactor, curY is set to point to the bottom edge of the last page of the target document, and the width of the LayoutRegion is set equal to the newly defined page width (step 940).

If ScalingFactor is less than about 0.7, a flag LandscapeView? is set to TRUE. A new ScalingFactor is recomputed by dividing the target height of target document by the returned width value. If the resulting value is greater than one it is set equal to one. A new LayoutRegion is then created in which page height and width are defined equal to the complementary page dimension (i.e., height for width and vice versa) divided by ScalingFactor, curY is set to point to the bottom edge of the last page of the target document, and the width of the LayoutRegion is set to the newly defined page width (step 950).

In another embodiment, the user may specify the value of the threshold at which the LandscapeView? flag is set to TRUE, and may also specify that the LandscapeView? flag is never set to TRUE.

Next, LayoutElement is called again, this time with the parse tree, the newly created LayoutRegion, and a RenderPDF? value of TRUE. The PDF pages produced by the call to LayoutElement are then all scaled by the ScalingFactor to convert them to the size of pages in the target document. The ScalingFactor is stored with each page for future reference. For example, if the user requests that the PDF page be displayed at its "natural size", the dimensions of the PDF page are divided by ScalingFactor to restore the page to its natural size. If LandscapeView? is TRUE, then each of the PDF pages produced by the call to LayoutElement is also rotated by 90 degrees (step 960). ConvertToPDF then exits (step 970).

FIGS. 17, 17*a* and 17*b* are a flowchart showing the steps taken by the routine LayoutElement. First, the variable Min-Width is made equal to the width of the LayoutRegion, and the pointer startY is assigned the value of curY (step 1000). Next, the type of the HTML object represented by the parse tree is determined. If the object is a unstructured content object (i.e., an object composed solely of text and images without internal structure, such as a paragraph, a form element, or a heading) (step 1010), LayoutElement computes the logical minimum width of the object by determining the width of the widest element within the object (i.e., the widest word or image); if this width is greater than MinWidth, then MinWidth is set to the width (step 1020).

If RenderPDF? is TRUE, then the object is placed into the target document at the position pointed to by curY. It should be noted that the object as displayed may take up multiple lines on the page. For example, if the object is a paragraph of text, the text will be placed so as to fill the current line, and continue onto additional lines, placing as many words as possible onto each line. If placing the object at the position pointed to by curY would place part of the object past the end of the current page, then it is determined whether an additional PDF page exists in the target document below the position indicated by curY. If no such page exists, it is created. If the object is small enough to be placed in its entirety on the additional page, this is done. Otherwise the object is placed across the page boundary, making sure not to place characters or images across the page boundary if possible. The pointer curY is then incremented to point to the location immediately below the placed object (step 1030).

Notwithstanding the value of RenderPDF?, the value of curY is then incremented by the height of the object (step 1040).

The value of MinWidth, and the difference between curY and startY are then returned, representing the actual dimensions of the screen object (step 1050).

If the object is a list or list-like object (e.g., a menu, an ordered list, or a directory list) or the body of a simple document (i.e., not a frame set) (step 1060), then the following steps are taken. For each element of the list or screen object within the body of the document, the routine LayoutElement is called, with the list element or document screen object, the current LayoutRegion, and the value of RenderPDF? as arguments. For each such call, if the returned width value is greater than MinWidth, MinWidth is set to that value (step 1070). After all such elements or screen objects have been processed in this way, the value of MinWidth and the difference between curY and startY are returned (step 1080).

If the object is a table (step 1090), the following steps are taken. Referring now to FIG. 17*a*, the widths of the table columns are set so as to equal in total MinWidth (step 1110). The relative width of each column is determined according to HTML table configuration information provided with the HTML table markup. Then, for each row in the table, starting with the first row (step 1120), each of the cells that start within the row are processed sequentially (left to right) as follows. A new LayoutRegion is created with the current value of curY, and the current page size, but with left and right borders determined by the leftmost and rightmost extents of the columns to be occupied by the cell. LayoutElement is then called with the contents of the cell, the new LayoutRegion, and the value of RenderPDF? as arguments (step 1130).

After all of the cells in a row have been so processed, the following steps are taken: curY is set to the point below the tallest of the cells in the row (including any cells with a rowspan greater than one which terminate in the current row). Then, the width of the row (defined as the sum of the width values returned by LayoutElement for all cells occupying the row) is computed (step 1140), and processing of the next row begins at step 1130. After all rows have been processed in this way (step 1150), the value of MinWidth is compared to the width of each row, and if the width of the widest row is greater than MinWidth, then MinWidth is set equal to the width of that row (step 1160). The value of MinWidth and the difference between curY and startY are returned (step 1170).

Referring again to FIG. 17, if the object is a frame set, the following steps are taken. Referring now to FIG. 17*b*, for each frame in the top level frameset, a tentative width and position is determined, based on the value of MinWidth and the frame width information specified in the frameset. For example, if the top level frame set defines horizontal frames, the tentative width of each frame would be MinWidth. If the top level frame set defines vertical frames, then the tentative widths of each frame would be determined by dividing up the width specified by MinWidth according to the relative widths of the frames as specified in the frame set. Then, for each frame in the top level frame set, a new LayoutRegion is created having the existing page size, and the tentative width and position of the frame, with curY set to point to the top edge of the frame (step 1190).

Then, if the top level frame set contains horizontal frames (step 1200), the following steps are taken. For each top level frame in the frame set starting with the first such frame (step 1210), LayoutElement is called, with the contents of the frame, the newly created LayoutRegion and RenderPDF? as arguments (step 1220). After each such call, the value of curY is incremented by the height value returned by LayoutElement (step 1230). If the width value returned by any call to LayoutElement is greater than MinWidth (step 1240), then MinWidth is set to that value, curY is reset to equal startY (step 1250), and the process begins anew at step 1190. After all frames in the top level frame set have been so processed (step 1260), the value of MinWidth and the difference between curY and startY are returned (step 1270).

If the frames in the top level frame set are vertical frames (step 1200), the following steps are taken. For each top level frame in the frame set, LayoutElement is called with the contents of the frame, the newly created LayoutRegion and the value of RenderPDF? as arguments (step 1280). After each top level frame has been so processed, the sum of the widths returned by each of these calls to LayoutElement is tested (step 1290). If this sum is greater than MinWidth, then MinWidth is set equal to the sum of the widths (step 1300) and the process begins anew at step 1190. Otherwise, curY is incremented by the greatest of the height values returned by the calls to LayoutElement (step 1310), and the value of MinWidth and the difference between curY and startY are returned (step 1320).

FIGS. 18-21 illustrate the result of applying the present method to an HTML document. Shown in FIG. 18 is the display in a web browser of an HTML document consisting of two frames 1410 and 1420. Although frame 1410 roughly fits within the browser window, frame 1420 extends beyond the bottom edge of the browser window and may be viewed by using the slider to reposition the frame within the window, as illustrated in FIG. 19. FIGS. 20 and 21 show the set of PDF pages that are produced by applying the present method to the HTML document shown in FIGS. 18 and 19. As can be seen, frame 1410, which is small enough to fit on a single page, is shown on page 1440, along with the initial part of frame 1420. On pages 1450 and 1460, the remaining parts of frame 1420 are displayed. Note that the width of frame 1420 is equal to the width of graphic 1430, the screen object with the widest logical width within the frame.

Other embodiments are within the scope of the following claims. For example, the order of steps of the invention may be changed. The user computer may be a single-user or a multi-user platform, or it may be an embedded computer, such as in a consumer television, personal digital assistant, Internet surfing, or special-purpose appliance product. The web pages may reside on a wide area network, on a local area network, or on a single file system. The target document may be an unpaginated document having a fixed width. The target document may be a paginated document with variable width pages. The web pages need not be coded in HTML, but may be in any semantic markup language. The target document need not be coded in PDF, but may be in any physical markup language.

While specific embodiments have been described herein for purposes of illustration, various modifications may be made without departing from the spirit and scope of the invention. Accordingly, the invention is not limited to the above described embodiments, but instead is defined by the claims which follow, along with their full scope of equivalents.

What is claimed is:

1. A system for creating a distinguishing identifier of a collection of data comprising a primary document and one or more auxiliary documents, the system comprising:

a computer processor; and a computer readable storage medium storing instructions that, when executed by the computer processor, cause the computer processor to:

digest each auxiliary document to create a respective auxiliary document digest; and create a distinguishing identifier by digesting a concatenation of the primary document with all auxiliary document digests.

2. The system of claim 1, wherein digesting comprises applying a digital digest algorithm.

3. The system of claim 2, wherein the digital digest algorithm is the MD5 Message Digest Algorithm.

4. The system of claim 1, wherein the primary document includes one or more references to the auxiliary documents, and wherein interpretation of the references causes content from the auxiliary documents to be displayed as part of the primary document.

5. A computer program product, residing on a computer readable storage medium, for creating a distinguishing identifier of a collection of data comprising a primary document and one or more auxiliary documents, comprising instructions for causing a computer to:

digest each auxiliary document to create a respective auxiliary document digest; and create a distinguishing identifier by digesting a concatenation of the primary document with all auxiliary document digests.

6. The computer program product of claim 5, wherein:

the instructions for causing a computer to digest comprise instructions causing a computer to apply a digital digest algorithm.

7. The computer program product of claim 6, wherein the digital digest algorithm is the MD5 Message Digest Algorithm.

8. The computer program product of claim 5, wherein the primary document includes one or more references to the auxiliary documents, and wherein interpretation of the references causes content from the auxiliary documents to be displayed as part of the primary document.

9. A method for creating a distinguishing identifier of a collection of data comprising a primary document and one or more auxiliary documents, comprising:
   digesting each auxiliary document to create a respective auxiliary document digest; and
   creating a distinguishing identifier by digesting a concatenation of the primary document with all auxiliary document digests.

10. The method of claim 9, wherein:
    the steps of digesting comprise applying a digital digest algorithm.

11. The method of claim 10, wherein the digital digest algorithm is the MD5 Message Digest Algorithm.

12. The method of claim 9, wherein the primary document includes one or more references to the auxiliary documents, and wherein interpretation of the references causes content from the auxiliary documents to be displayed as part of the primary document.

\* \* \* \* \*